(12) United States Patent
Kim et al.

(10) Patent No.: US 12,436,376 B2
(45) Date of Patent: Oct. 7, 2025

(54) FLYING-OVER BEAM PATTERN SCANNING HOLOGRAM MICROSCOPE DEVICE USING SCAN MIRROR AND TRANSLATION STAGE

(71) Applicant: CUBIXEL CO., LTD., Seoul (KR)

(72) Inventors: Tae Geun Kim, Seoul (KR); Tae Woong Kim, Gwangju-si (KR); Seung Ram Lim, Seoul (KR); Kyung Beom Kim, Seoul (KR); Eung Joon Lee, Seoul (KR); Dong Hwan Im, Seoul (KR)

(73) Assignee: CUBIXEL CO., LTD., Seoul (KR)

( * ) Notice: Subject to any disclaimer, the term of this patent is extended or adjusted under 35 U.S.C. 154(b) by 366 days.

(21) Appl. No.: 18/024,493

(22) PCT Filed: Sep. 6, 2021

(86) PCT No.: PCT/KR2021/012003
§ 371 (c)(1),
(2) Date: Mar. 2, 2023

(87) PCT Pub. No.: WO2022/055194
PCT Pub. Date: Mar. 17, 2022

(65) Prior Publication Data
US 2023/0324667 A1    Oct. 12, 2023

(30) Foreign Application Priority Data
Sep. 8, 2020  (KR) .......................... 10-2020-0114666

(51) Int. Cl.
*G02B 21/36* (2006.01)
*G02B 3/08* (2006.01)
*G03H 1/00* (2006.01)

(52) U.S. Cl.
CPC ............. *G02B 21/361* (2013.01); *G02B 3/08* (2013.01); *G03H 1/0005* (2013.01); *G03H 2001/005* (2013.01)

(58) Field of Classification Search
CPC ........................... G03H 1/0005; H10F 77/147
See application file for complete search history.

(56) References Cited

U.S. PATENT DOCUMENTS 5,381,224 A * 1/1995 Dixon ................ G01N 21/6456
356/417
6,262,818 B1 * 7/2001 Cuche .................. G03H 1/0866
359/9

(Continued)

FOREIGN PATENT DOCUMENTS

CN    105204311 A    12/2015
CN    107835074 A    3/2018

(Continued)

OTHER PUBLICATIONS

Kim, Y.S. and Kim, T.G., 2011. Auto-focus of Optical Scanning Holographic Microscopy Using Partial Region Analysis. Korean Journal of Optics and Photonics, 22(1), pp. 10-15.) (Year: 2011).*

(Continued)

*Primary Examiner* — Uzma Alam
*Assistant Examiner* — Mohamed Doumbia
(74) *Attorney, Agent, or Firm* — Revolution IP, PLLC

(57) ABSTRACT

A flying-over beam pattern scanning hologram microscope device includes: a scan beam generation unit which converts a first beam and a second beam to a first spherical wave and a second spherical wave, and then allows the first and second spherical waves to interfere with each other to form a scan beam; a scanning unit, which comprises a scan mirror for controlling the scan beam in the horizontal direction, and a translation stage for moving an object in the vertical direction at the rear end of the projection unit; the projection unit (Continued)

projecting the scan beam onto an object plane; and a light collection unit for detecting a beam that has passed through the objective lens again after fluorescing or being reflected from an object.

19 Claims, 12 Drawing Sheets

(56) References Cited

U.S. PATENT DOCUMENTS

| | | | |
|---|---|---|---|
| 2014/0240820 A1* | 8/2014 | Sitter, Jr. ............ | G02B 17/0642 359/399 |
| 2017/0105618 A1 | 4/2017 | Schmoll et al. | |
| 2021/0223525 A1* | 7/2021 | Lv ........................ | G02B 21/008 |

FOREIGN PATENT DOCUMENTS

| | | | | |
|---|---|---|---|---|
| CN | 108802989 A | 11/2018 | | |
| KR | 10-2008-0053558 A | 6/2008 | | |
| KR | 10-2013-0081127 A | 7/2013 | | |
| KR | 10-1304695 B1 | 9/2013 | | |
| KR | 1304695 B1 * | 9/2013 | ....... | G11B 20/10037 |
| KR | 10-1523173 B1 | 5/2015 | | |
| KR | 10-1830785 B1 | 2/2018 | | |
| KR | 1830785 B1 * | 2/2018 | ......... | G01B 11/0608 |

OTHER PUBLICATIONS

International Search Report for PCT/KR2021/012003 mailed Dec. 10, 2021 from Korean Intellectual Property Office.

Kim, You Seok et al., "Auto-focus of Optical Scanning Holographic Microscopy Using Partial Region Analysis", Optical Society of Korea, Feb. 4, 2011, vol. 22, No. 1, pp. 10-15.

Zhang et al., "Annular pupil in optical scanning holography", In: Digital Holography and Three-Dimensional Imaging, 2019, Optical Society of America, May 23, 2019, pp. 1-2.

* cited by examiner

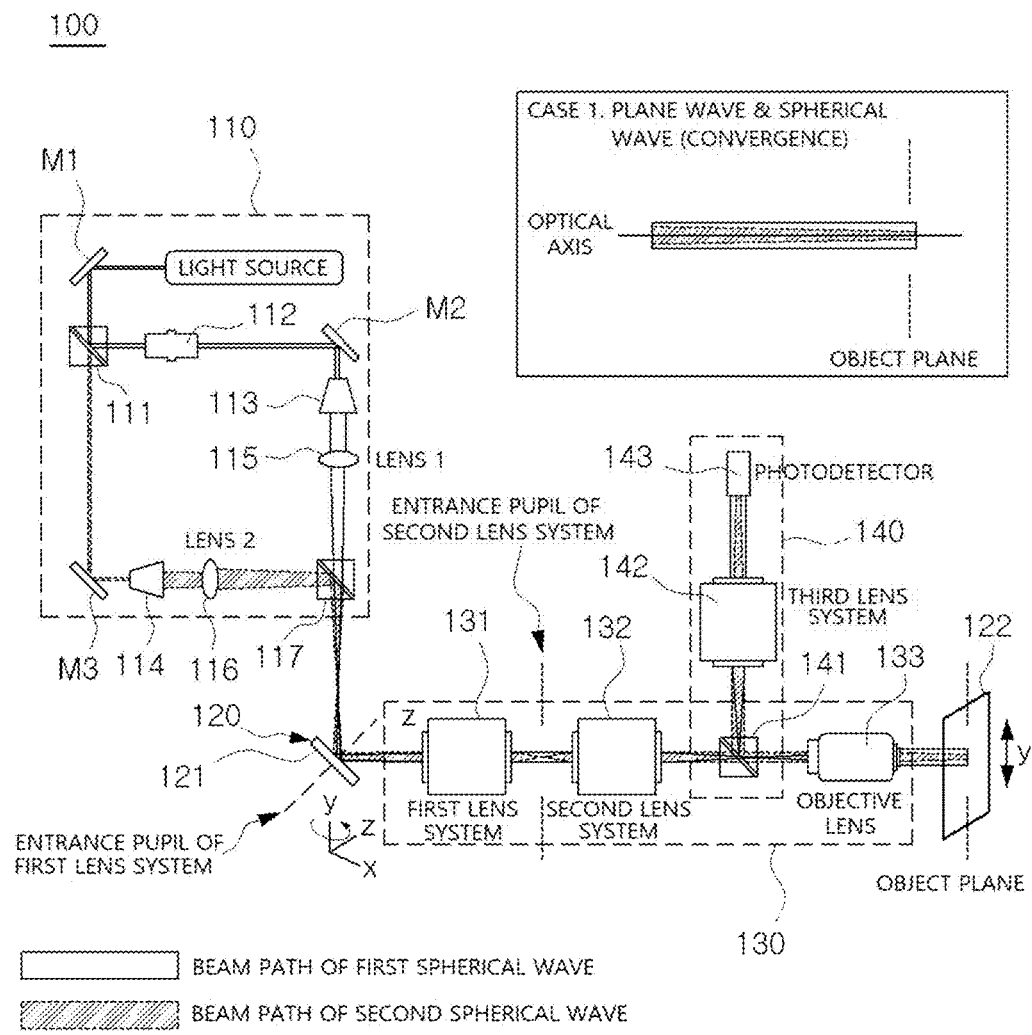
[FIG. 1]

[FIG. 2]
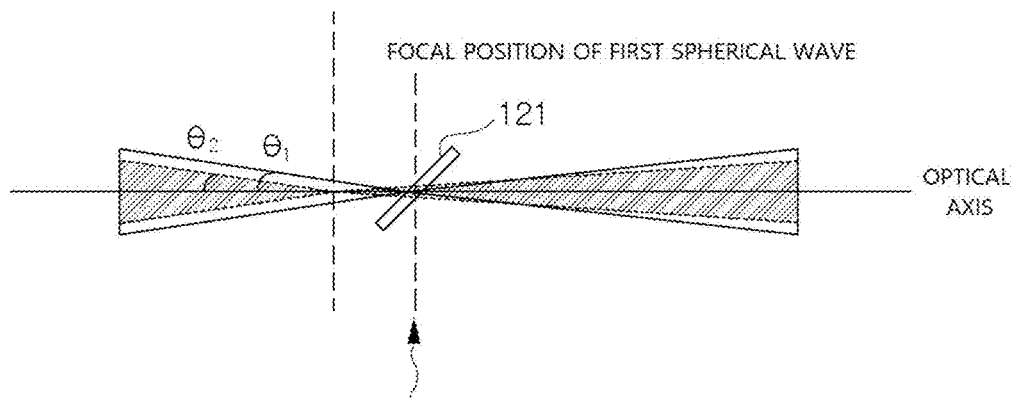

[FIG. 3A]
PLANE MODEL OF CARDINAL POINT OF GENERAL OPTICAL SYSTEM
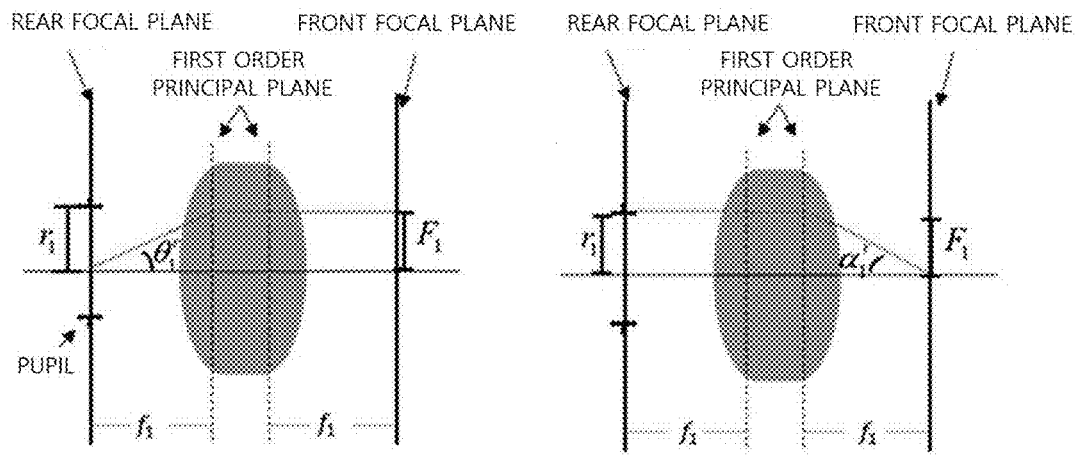
[FIG. 3B]
PLANE MODEL OF APLANATIC POINT OF GENERAL OPTICAL SYSTEM
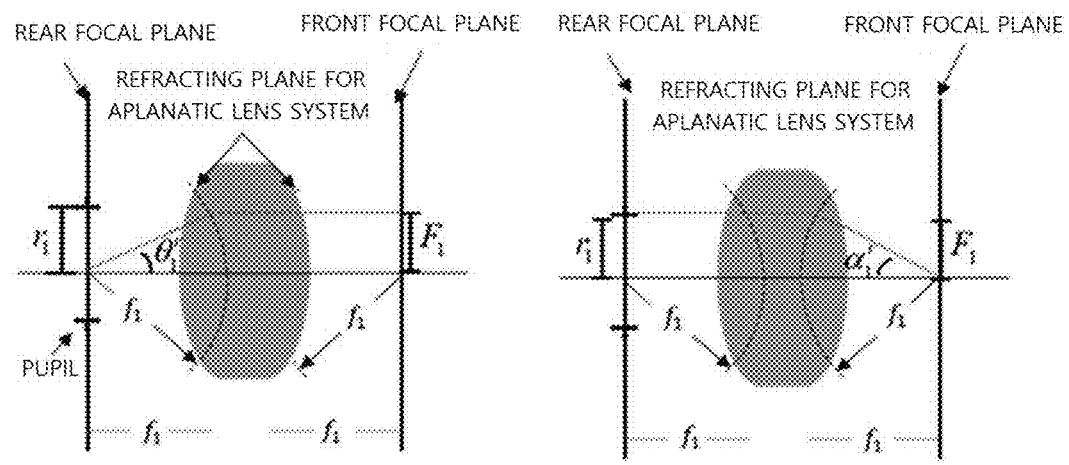

[FIG. 4]
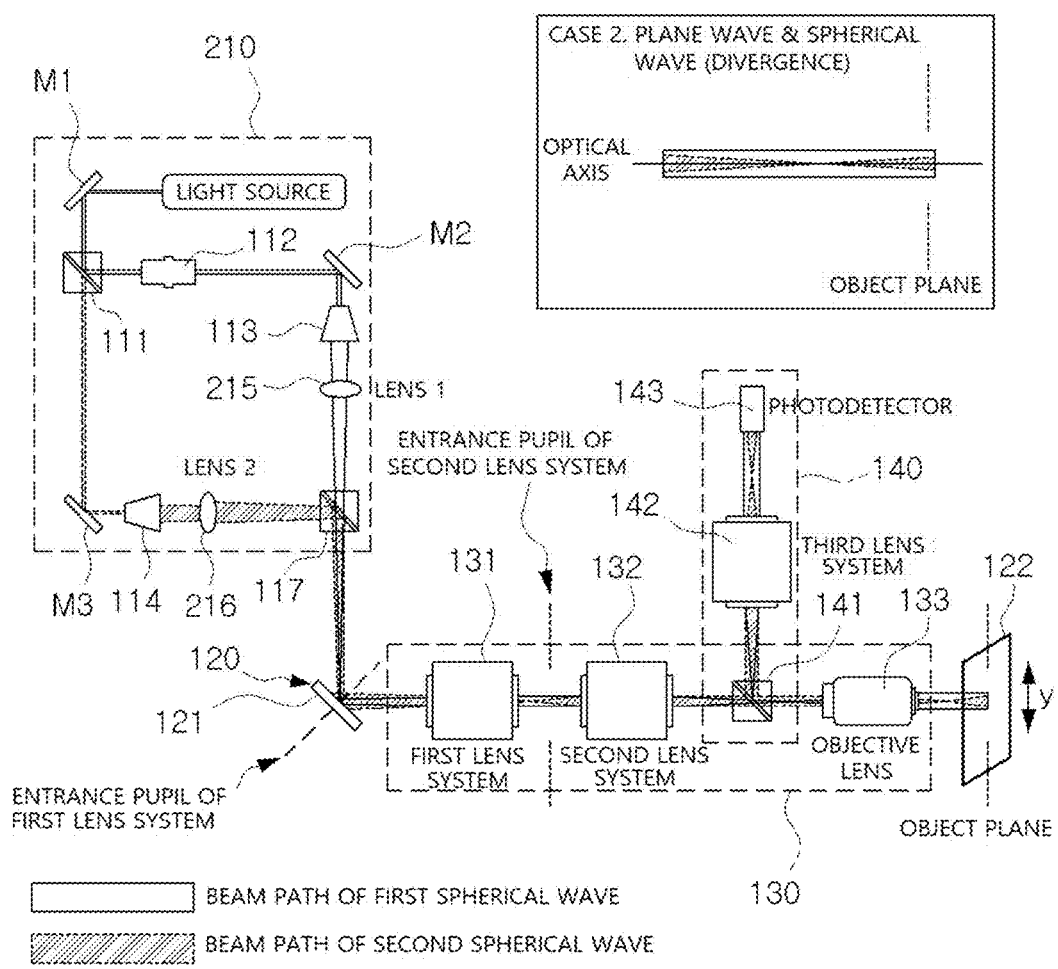

[FIG. 5]
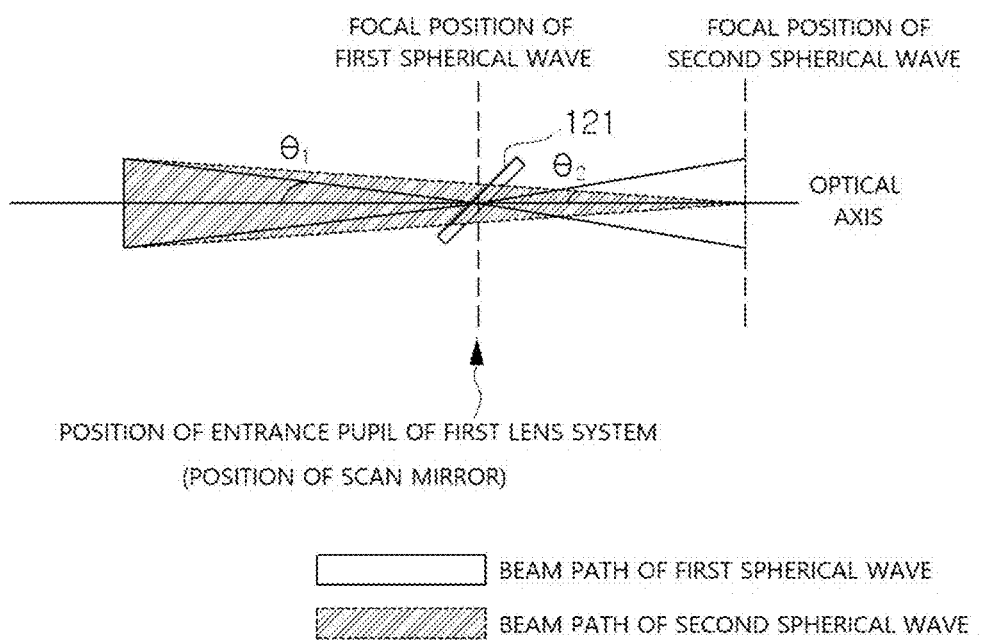

[FIG. 6]
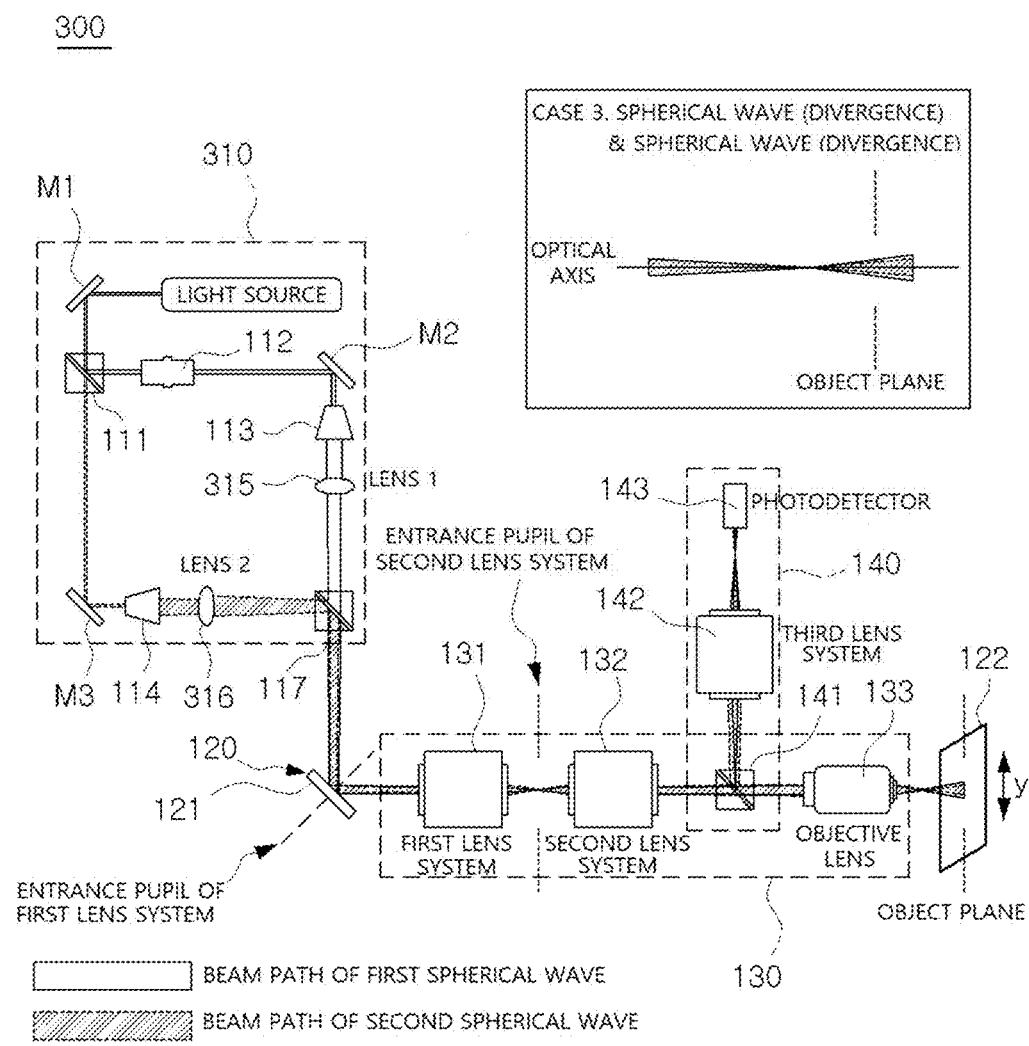

[FIG. 7]
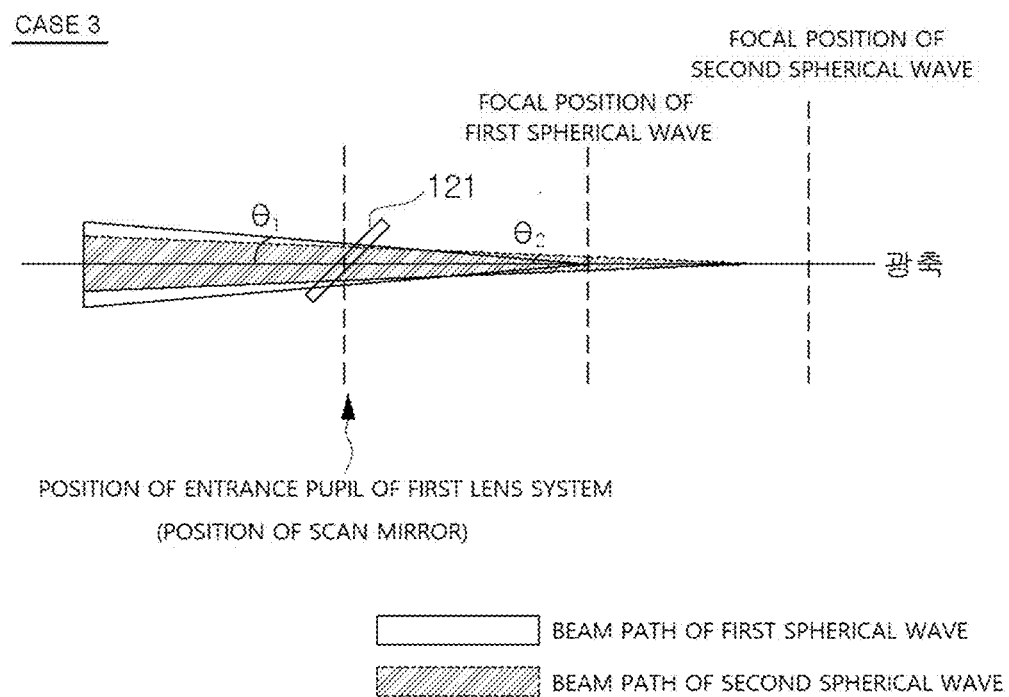

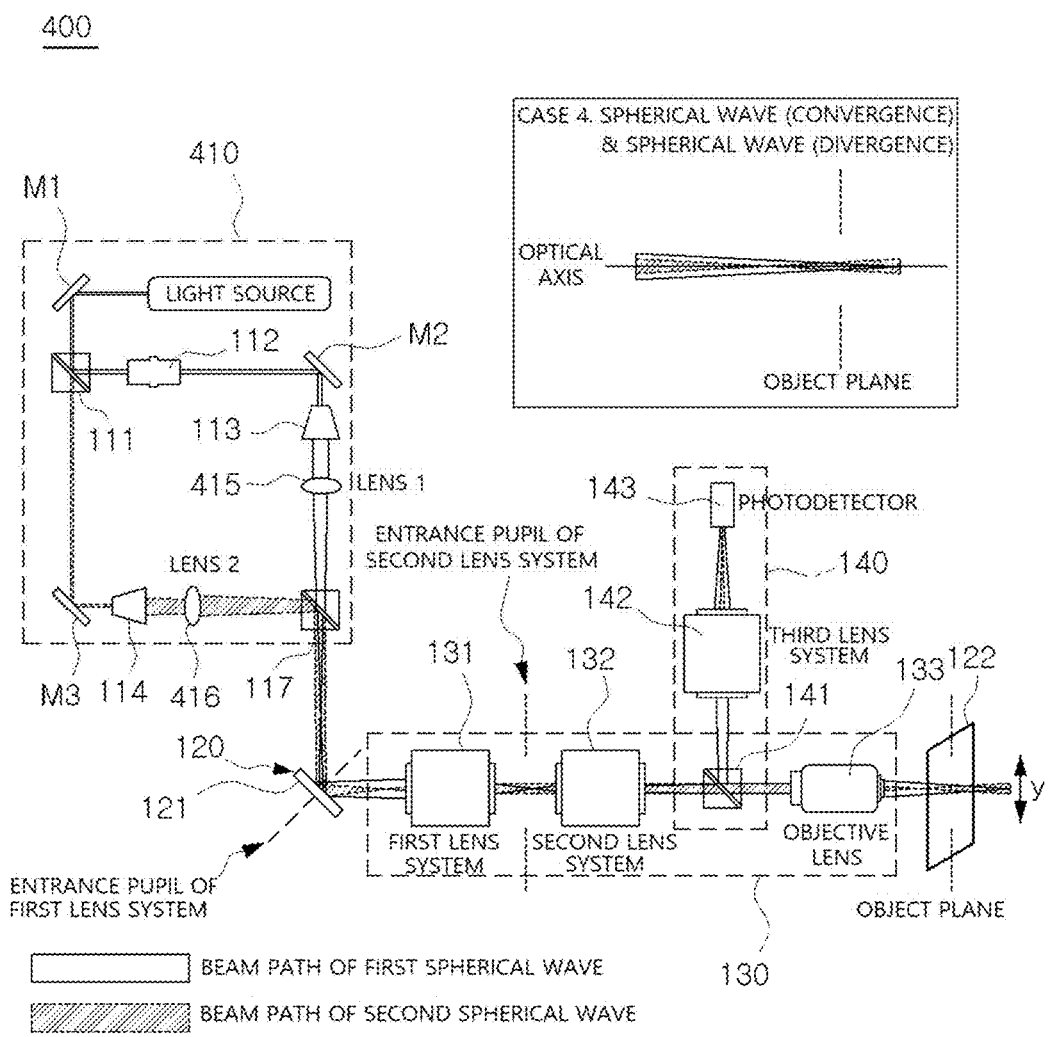
[FIG. 8]

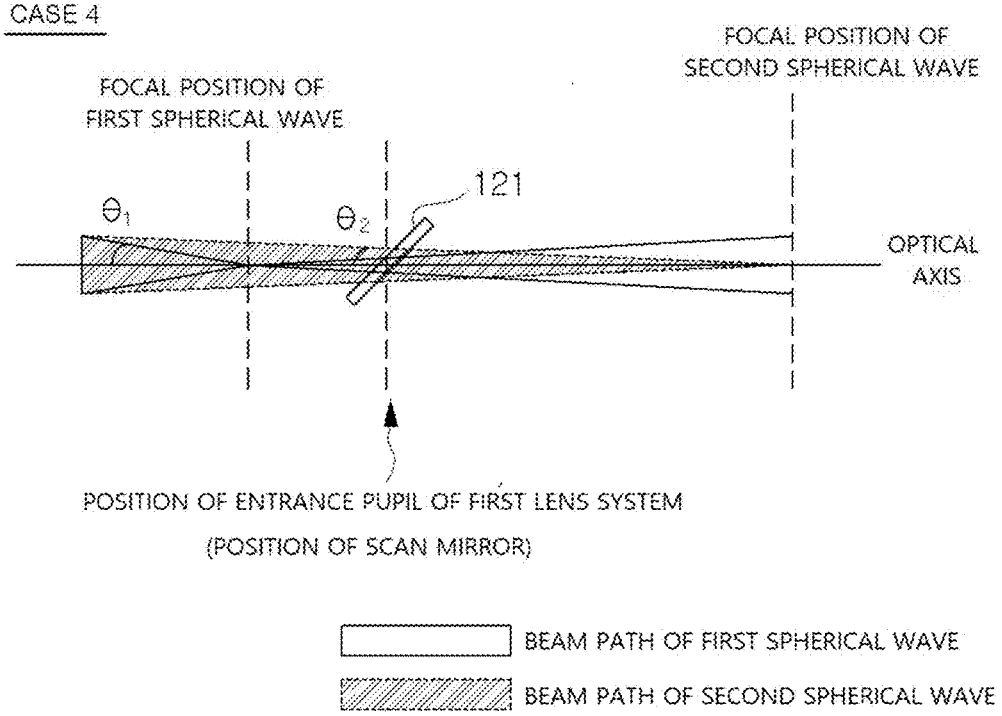

[FIG. 10]
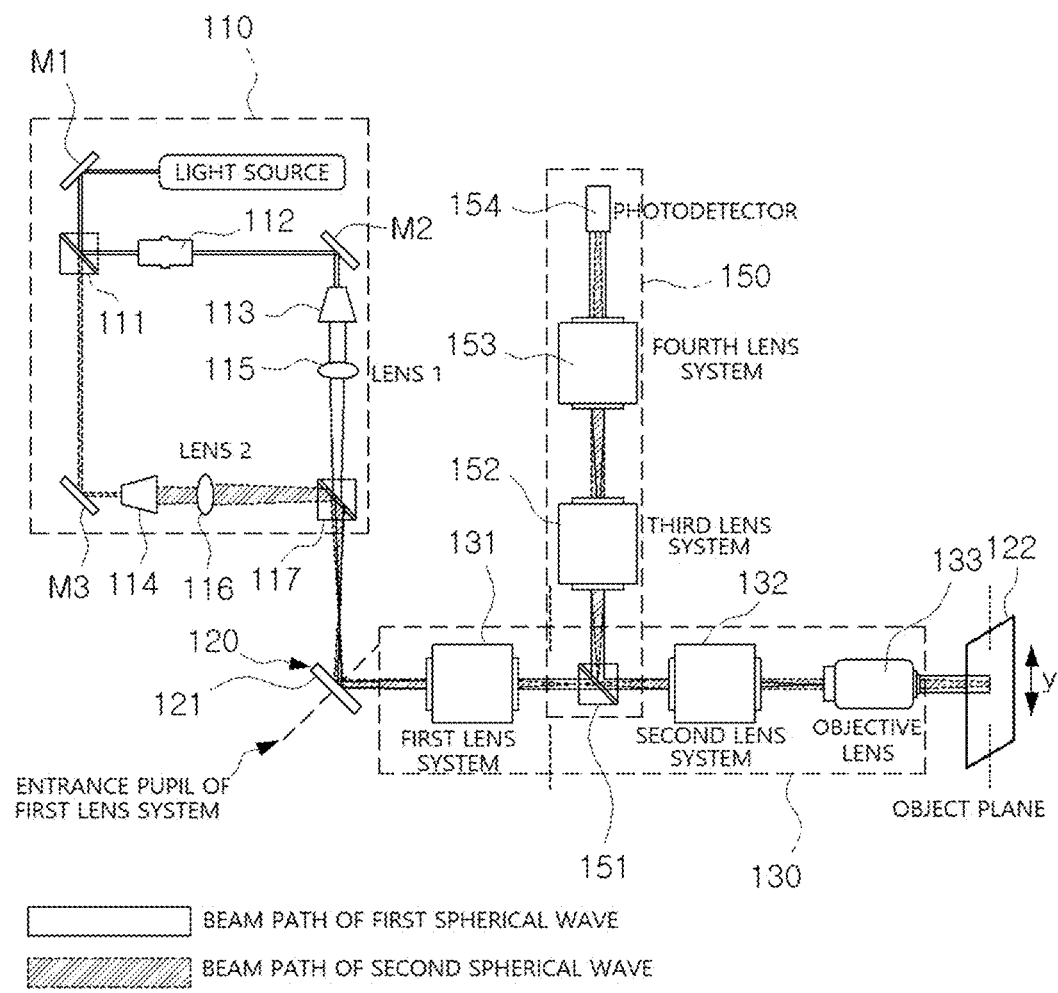

[FIG. 11]
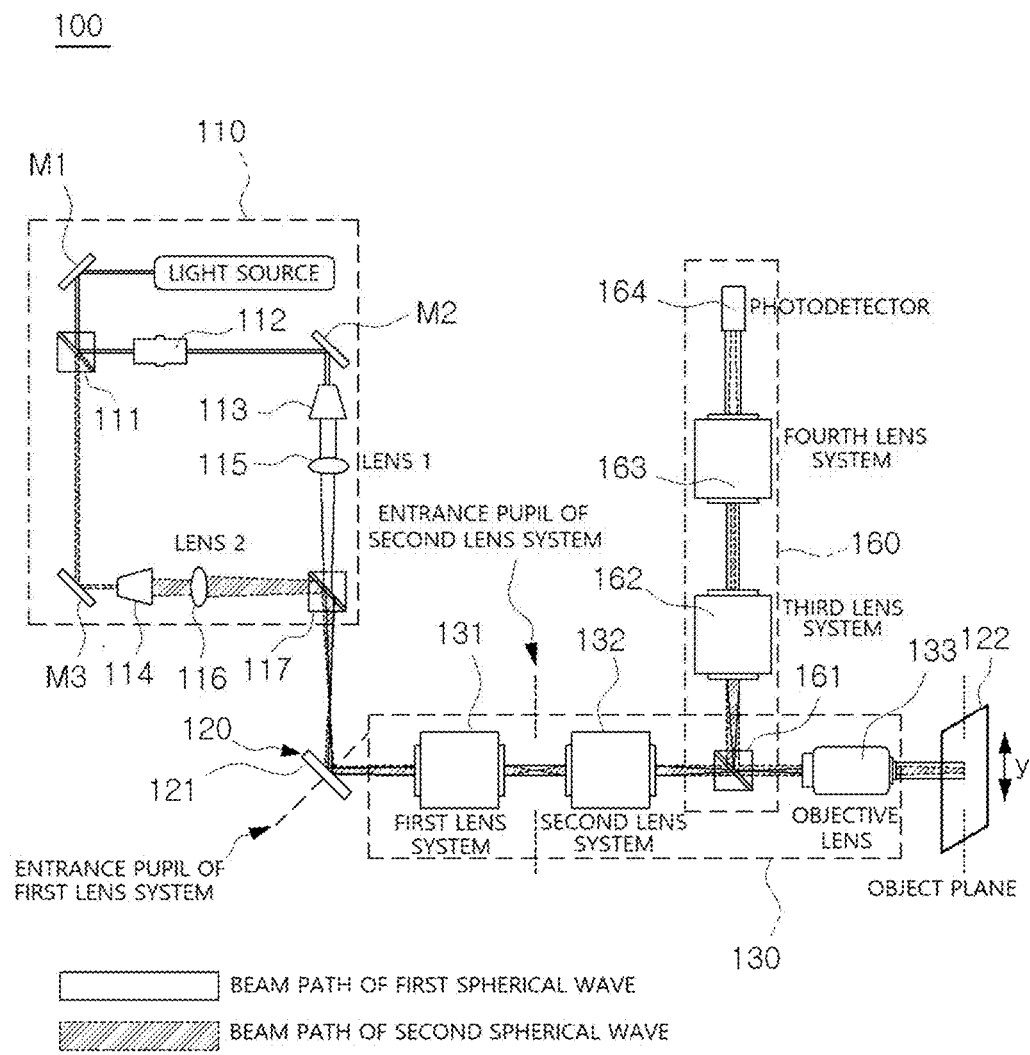

[FIG. 12]
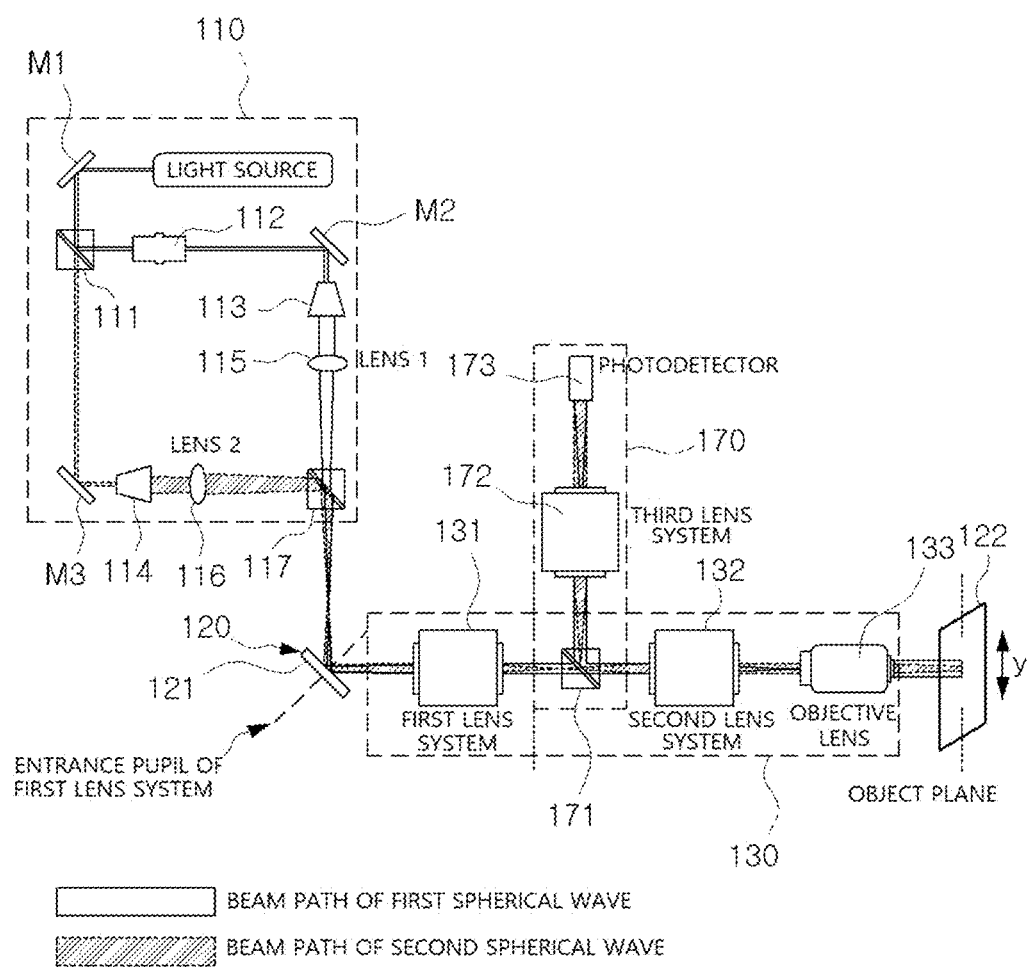

FLYING-OVER BEAM PATTERN SCANNING HOLOGRAM MICROSCOPE DEVICE USING SCAN MIRROR AND TRANSLATION STAGE

CROSS REFERENCE TO PRIOR APPLICATIONS

This application is the 35 U.S.C. 371 national stage of International application PCT/KR2021/012003 filed on Sep. 6, 2021; which claims priority to Korean Patent Application No. 10-2020-0114666 filed on Sep. 8, 2020. The entire contents of each of the above-identified applications are hereby incorporated by reference.

TECHNICAL FIELD

The present invention relates to a flying-over beam pattern scanning hologram microscope device using a scan mirror and a translation stage, and more particularly, to a flying-over beam pattern scanning hologram microscope device capable of realizing a high-resolution scanning hologram microscope at high speed.

BACKGROUND ART

A conventional optical scanning hologram microscope scans an object by forming a beam pattern with a spatial distribution of a Fresnel zone plate by using an interferometer, forming the formed beam pattern into a high-resolution Fresnel zone pattern on an object plane through a objective lens, projecting the beam pattern onto an object, and moving an object plate, on which the object is placed, by a mechanical method. A hologram of the object is acquired by condensing a beam, which fluoresces or is reflected from the object, on a Fourier plane of a light collecting lens.

However, in such a conventional method, since the object plate is mechanically moved, the hologram acquisition speed is slow and it is difficult to acquire a hologram of a fluid such as a living body.

The technology that is the background of the present invention is disclosed in Korean Patent Registration No. 1304695 (registered on Sep. 6, 2013).

DISCLOSURE

Technical Problem

The present invention aims to provide a flying-over beam pattern scanning hologram microscope device using a scan mirror and a translation stage, capable of realizing a high-resolution scanning hologram microscope at high speed.

Technical Solution

The present invention provides a flying-over beam pattern scanning hologram microscope device including: a scan beam generation unit which modulates a phase of a first beam split from a light source to convert the first beam to a first spherical wave through a first lens, converts a second beam to a second spherical wave through a second lens, and then allows the first and second spherical waves to interfere with each other to form a scan beam; a scanning unit which includes a scan mirror for controlling the incident scan beam in a horizontal direction to be transferred to a projection unit, so as to control a scanning position of the scan beam for an object in horizontal and vertical directions, and a translation stage for moving the object in a vertical direction at a rear end of the projection unit; the projection unit which includes multiple lens systems and an objective lens, and projects the scan beam transferred from the scanning unit onto an object plane on which the object is placed; and a light collection unit which detects a beam that has passed through the objective lens again after fluorescing or being reflected from an object, wherein the scan beam projected onto the object plane has different patterns according to focal position and conical angle conditions of each of the first and second spherical waves formed on the scan mirror.

In addition, the scan beam projected onto the object plane may be determined as one of an interference structure (first pattern) between a converging spherical wave and a plane wave on the object plane according to focal position and conical angle conditions of each of the first and second spherical waves formed on the scan mirror, an interference structure (second pattern) between a diverging spherical wave and a plane wave on the object plane, an interference structure (third pattern) between two diverging spherical waves on the object plane, and an Interference structure (fourth pattern) between a converging spherical wave and a diverging spherical wave on the object plane.

In addition, the projection unit may include a first lens system, a second lens system, and the objective lens, which are sequentially disposed between the scanning unit and the object plane, and an entrance pupil of the first lens system may be located in the scan mirror.

In addition, when the, the first and second spherical waves may become a plane wave and a converging spherical wave with respect to the object plane, respectively, so that the scan beam projected onto the object plane has an interference structure between the converging spherical wave and the plane wave on the object plane, and the first condition may be a condition that a focal position of the first spherical wave is the same as a position of the entrance pupil of the first lens system, a focal position of the second spherical wave is the same as the position of the entrance pupil of the first lens system or in front of the entrance pupil of the first lens system, and conical angles $(\theta_1, \theta_2)$ of the first and second spherical waves satisfy $\theta_2 \leq \theta_1$.

In addition, when the condition is a second condition, the first and second spherical waves may become a plane wave and a diverging spherical wave with respect to the object plane, respectively, so that the scan beam projected onto the object plane has an interference structure between the diverging spherical wave and the plane wave on the object plane, and the second condition may be a condition that a focal position of the first spherical wave is the same as a position of the entrance pupil of the first lens system, a focal position of the second spherical wave is the same as the position of the entrance pupil of the first lens system or behind the entrance pupil of the first lens system, and conical angles $(\theta_1, \theta_2)$ of the first and second spherical waves satisfy $\theta_2 \leq \theta_1 \leq 2\theta_2$.

In addition, when the condition is a third condition, both the first and second spherical waves may become diverging spherical waves with respect to the object plane, so that the scan beam projected onto the object plane has an interference structure between the two diverging spherical waves on the object plane, and the third condition may be a condition that a focal position of the first spherical wave is behind the entrance pupil of the first lens system, a focal position of the second spherical wave is behind the focal position of the first spherical wave, and conical angles $(\theta_1, \theta_2)$ of the first and second spherical waves satisfy $\theta_2 \leq \theta_1$.

In addition, when the condition is a fourth condition, the first and second spherical waves may become a converging spherical wave and a diverging spherical wave with respect to the object plane, respectively, so that the scan beam projected onto the object plane has an interference structure between the converging spherical wave and the diverging spherical wave on the object surface, and the fourth condition may be a condition that a focal position of the first spherical wave is in front of the entrance pupil of the first lens system, a focal position of the second spherical wave is behind the entrance pupil of the first lens system, and conical angles ($\theta_1$, $\theta_2$) of the first and second spherical waves satisfy $\theta_2 < \theta_1$.

$$|\theta_2 - \theta_1| < \frac{1}{2}|\theta_2 + \theta_1| \qquad [13]$$

In addition, in response to the first condition, the first lens system may transfer the received scan beam to the second lens system, and the first and second lens systems may satisfy conditions of Equation below.

$|\theta_1 + \theta_s| \leq |\theta_1{}^r|_1$ $|\theta_2 + \theta_s| \leq |\theta_1{}^r|$ $|r_{sph1}| \leq |f_1 \alpha_1{}^r|$ $|r_{sph2}| \leq |f_1 \alpha_1{}^r|$ wherein $\theta_1$ and $\theta_2$ represent the conical angles (convergence half-angles) of the first and second spherical waves, $\theta s$ represents a scan angle at the scan mirror of the scanning unit, $\theta_1{}^r$ represents an acceptance angle of the first lens system, $f_1$ represents an effective focal length of the first lens system, $\alpha_1{}^r$ represents a convergence angle of a front focal plane of the first lens system, and $rsph_1$ and $rsph_2$ represent radii of the first and second spherical waves on an entrance pupil plane of the first lens system.

In addition, in response to the second condition, the first lens system may transfer the received scan beam to the second lens system, and the first and second lens systems may satisfy conditions of Equation below:

$|\theta_1 + \theta_s| \leq |\theta_1{}^r|_1$ $|\theta_2 + \theta_s| \leq |\theta_1{}^r|$ $|r_{sph1}| \leq |f_1 \alpha_1{}^r|$ $|r_{sph2}| \leq |f_1 \alpha_1{}^r|$ wherein $\theta_1$ and $\theta_2$ represent the conical angles (convergence half-angles) of the first and second spherical waves, $\theta_s$ represents a scan angle at the scan mirror of the scanning unit, $\theta_1{}^r$ represents an acceptance angle of the first lens system, $f_1$ represents an effective focal length of the first lens system, $\alpha_1{}^r$ represents a convergence angle of a front focal plane of the first lens system, and $r_{sph1}$ and $rsph_2$ represent radii of the first and second spherical waves on an entrance pupil plane of the first lens system.

In addition, in response to the third condition, the first lens system may transfer the received scan beam to the second lens system, and the first and second lens systems may satisfy conditions of Equation below:

$|\theta_1 + \theta_s| \leq |\theta_1{}^r|_1$ $|\theta_2 + \theta_s| \leq |\theta_1{}^r|$ $|r_{sph1}| \leq |f_1 \alpha_1{}^r|$ $|r_{sph2}| \leq |f_1 \alpha_1{}^r|$ wherein $\theta_1$ and $\theta_2$ represent the conical angles (convergence half-angles) of the first and second spherical waves, $\theta_s$ represents a scan angle at the scan mirror of the scanning unit, $\theta_1{}^r$ represents an acceptance angle of the first lens system, $f_1$ represents an effective focal length of the first lens system, $\alpha_1{}^r$ represents a convergence angle of a front focal plane of the first lens system, and $rsph_1$ and $rsph_2$ represent radii of the first and second spherical waves on an entrance pupil plane of the first lens system.

In addition, in response to the fourth condition, the first lens system may transfer the received scan beam to the second lens system, and the first and second lens systems may satisfy conditions of Equation below:

$|\theta_1 + \theta_s| \leq |\theta_1{}^r|_1$ $\theta_2 + \theta_s \leq \theta_1{}^r$ $r_{sph1} \leq f_1 \alpha_1{}^r$ $r_{sph2} \leq f_1 \alpha_1{}^r$ wherein $\theta_1$ and $\theta_2$ represent the conical angles (convergence half-angles) of the first and second spherical waves, $\theta_s$ represents a scan angle at the scan mirror of the scanning unit, $\theta_1{}^r$ represents an acceptance angle of the first lens system, $f_1$ represents an effective focal length of the first lens system, $\alpha_1{}^r$ represents a convergence angle of a front focal plane of the first lens system, and $r_{sph1}$ and $r_{sph2}$ represent radii of the first and second spherical waves on an entrance pupil plane of the first lens system.

In addition, in response to the first condition, both of a radius of the plane wave on the object plane corresponding to the first spherical wave and a radius of the converging spherical wave on the object plane corresponding to the second spherical wave may be smaller than or equal to a radius of field of view of the objective lens as shown in Equation below:

$$\left|(\theta_1 + \theta_s)\frac{f_0 f_1}{f_2}\right| \leq |F_{obj}|, \left|(\theta_2 + \theta_s)\frac{f_0 f_1}{f_2}\right| \leq |F_{obj}|, \qquad [27]$$

wherein $\theta_1$ and $\theta_2$ represent the conical angles (half-convergence angles) of the first and second spherical waves, $\theta s$ represents a scan angle at the scan mirror of the scanning unit, $F_{obj}$ represents a radius of field of view in a front focal plane of the objective lens, $f_0$ represents an effective focal length of the objective lens, and $f_1$ and $f_2$ represent effective focal lengths of the first and second lens systems.

In addition, in response to the second condition, both of a radius of the plane wave on the object plane corresponding to the first spherical wave and a radius of the diverging spherical wave on the object plane corresponding to the second spherical wave may be smaller than or equal to a radius of field of view of the objective lens as shown in Equation below:

$$\left|(\theta_1 + \theta_s)\frac{f_0 f_1}{f_2}\right| \leq |F_{obj}|, \left|(\theta_2 + \theta_s)\frac{f_0 f_1}{f_2}\right| \leq |F_{obj}|, \qquad [30]$$

wherein $\theta_1$ and $\theta_2$ represent the conical angles (half-convergence angles) of the first and second spherical waves, $\theta_s$ represents a scan angle at the scan mirror of the scanning unit, $F_{obj}$ represents a radius of field of view in a front focal plane of the objective lens, $f_0$ represents an effective focal length of the objective lens, and $f_1$ and $f_2$ represent effective focal lengths of the first and second lens systems.

In addition, in response to the third condition, both of a radius of the diverging spherical wave on the object plane corresponding to the first spherical wave and a radius of the diverging spherical wave on the object plane corresponding to the second spherical wave may be smaller than or equal to a radius of field of view of the objective lens as shown in Equation below:

$$\left|(\theta_1+\theta_s)\frac{f_0 f_1}{f_2}\right| \leq |F_{obj}|, \left|(\theta_2+\theta_s)\frac{f_0 f_1}{f_2}\right| \leq |F_{obj}|, \quad [33]$$

wherein $\theta_1$ and $\theta_2$ represent the conical angles (half-convergence angles) of the first and second spherical waves, $\theta_s$ represents a scan angle at the scan mirror of the scanning unit, $F_{obj}$ represents a radius of field of view in a front focal plane of the objective lens, $f_0$ represents an effective focal length of the objective lens, and $f_1$ and $f_2$ represent effective focal lengths of the first and second lens systems.

In addition, in response to the fourth condition, both of a radius of the converging spherical wave on the object plane corresponding to the first spherical wave and a radius of the diverging spherical wave on the object plane corresponding to the second spherical wave conditions may be smaller than or equal to a radius of field of view of the objective lens as shown in Equation below:

$$\left|(\theta_1-\theta_s)\frac{f_0 f_1}{f_2}\right| \leq |F_{obj}|, \left|(\theta_2+\theta_s)\frac{f_0 f_1}{f_2}\right| \leq |F_{obj}|,$$

wherein $\theta_1$ and $\theta_2$ represent the conical angles (half-convergence angles) of the first and second spherical waves, $\theta_s$ represents a scan angle at the scan mirror of the scanning unit, $F_{obj}$ represents a radius of field of view in a front focal plane of the objective lens, $f_0$ represents an effective focal length of the objective lens, and $f_1$ and $f_2$ represent effective focal lengths of the first and second lens systems.

In addition, optical invariance of the first and second lens systems may be greater than or equal to optical invariance of the objective lens as shown in Equation below:

$$I_1 \geq I_{obj}, I_2 \geq I_{obj}$$

wherein $I_1$, $I_2$, and $I_{obj}$ represent optical invariance of the first lens system, the second lens system, and the objective lens, respectively.

In addition, the light collection unit may include: a optical splitter which is disposed between the second lens system and the objective lens, and which transfers the beam passing through the second lens system to the objective lens, and reflects the beam reflected from the object and passing through the objective lens to the outside; a third lens system which receives the beam reflected by the optical splitter; and a photodetector which detects a beam passing through the third lens system, wherein a size of a detection plane of the photodetector satisfies Equation below:

$$\left|\frac{\theta_s f_1 f_3}{f_2}\right| \leq |F_{pd}| \text{ or } \left|\frac{F_0 f_3}{f_0}\right| \leq |F_{pd}|$$

wherein $F_{pd}$ represents the size of the detection plane, $\theta_s$ represents a scan angle at the scan mirror of the scanning unit, $f_1$ to $f_3$ represent effective focal lengths of the first to third systems, $f_0$ represents an effective focal length of the objective lens, and $F_o$ represents a radius of a field of view in a front focal plane of the objective lens.

In addition, the light collection unit may include: a optical splitter which is disposed between the first lens system and the second lens system, and which transfers the beam passing through the first lens system to the second lens system, and reflects the beam reflected from the object and passing the second lens system through the objective lens to the outside; a third lens system which receives the beam reflected by the optical splitter; a fourth lens system which receives the beam passing through the third lens system; and a photodetector which detects a beam passing through the fourth lens system, wherein a size of a detection plane of the photodetector satisfies Equation below:

$$\left|\frac{\theta_s f_1 f_4}{f_3}\right| \leq |F_{pd}| \text{ or } \left|\frac{F_0 f_2 f_4}{f_0 f_3}\right| \leq |F_{pd}|.$$

wherein $F_{pd}$ represents the size of the detection plane, $\theta_s$ represents a scan angle at the scan mirror of the scanning unit, $f_1$ to $f_4$ represent effective focal lengths of the first to fourth systems, $f_0$ represents an effective focal length of the objective lens, and $F_o$ represents a radius of a field of view in a front focal plane of the objective lens.

In addition, the light collection unit may include: a optical splitter which is disposed between the second lens system and the objective lens, and which transfers the beam passing through the second lens system to the objective lens, and reflects the beam reflected from the object and passing the objective lens to the outside; a third lens system which receives the beam reflected by the optical splitter; a fourth lens system which receives the beam passing through the third lens system; and a photodetector which detects a beam passing through the fourth lens system, wherein a spatial frequency-converted light distribution of an image on the object plane of the objective lens is generated on a detection plane of the photodetector, and a size of the detection plane of the photodetector satisfies Equation below:

$$|0.1 f_4 NA_{eff}| \leq |F_{pd}|$$

wherein $F_{pd}$ represents the size of the detection plane of the photodetector, $f_4$ represents an effective focal length of the fourth lens system, and $NA_{eff}$ represents an effective numerical aperture of the beam transferred to the object plane and is defined as a difference ($NA_{eff}=|NA_1-NA_2|$) between a numerical aperture ($NA_1$) of the first spherical wave and a numerical aperture ($NA_2$) of the second spherical wave, the first spherical wave and the second spherical wave being transferred to the object plane.

In addition, the light collection unit may include: a optical splitter which is disposed between the first lens system and the second lens system, and which transfers the beam passing through the first lens system to the second lens system, and reflects the beam reflected from the object and passing the second lens system through the objective lens to the outside; a third lens system which receives the beam reflected by the optical splitter; and a photodetector which detects a beam passing through the third lens system, wherein a spatial frequency-converted light distribution of an image on the object plane of the objective lens is generated on a detection plane of the photodetector, and a size of the detection plane of the photodetector satisfies Equation below:

$$|0.1 f_3 NA_{eff}| \leq |F_{pd}|$$

wherein $F_{pd}$ represents the size of the detection plane of the photodetector, $f_3$ represents an effective focal length of the third lens system, and $NA_{eff}$ represents an effective numerical aperture of the beam transferred to the object plane and is defined as a difference ($NA_{eff}=|NA_1-NA_2|$) between a numerical aperture ($NA_1$) of the first spherical wave and a numerical aperture ($NA_2$) of the second spherical wave, the first spherical wave and the second spherical wave being transferred to the object plane.

Advantageous Effects

According to the present invention, a high-resolution Fresnel zone pattern is formed as a scanning beam pattern on an objective surface through an objective lens, and a beam reflected from an object is imaged to a detection plane of a photodetector through the objective lens while performing a flying-over scan in which the pattern flies over the object, thereby implementing a high-resolution scanning hologram microscope at high speed.

DESCRIPTION OF DRAWINGS

FIG. 1 is a diagram illustrating a flying-over beam pattern scanning hologram microscope device according to a first embodiment of the present invention.

FIG. 2 is a diagram illustrating first and second spherical wave generation conditions of a scan beam generation unit for forming an interference structure on an object plane according to CASE 1 of FIG. 1.

FIGS. 3A and 3B are diagrams illustrating modeling of a lens system into a general optical system and an aplanatic optical system, respectively.

FIG. 4 is a diagram illustrating a flying-over beam pattern scanning hologram microscope device according to a second embodiment of the present invention.

FIG. 5 is a diagram illustrating first and second spherical wave generation conditions of a scan beam generation unit for forming an interference structure on an object plane according to CASE 2 of FIG. 4.

FIG. 6 is a diagram illustrating a flying-over beam pattern scanning hologram microscope device according to a third embodiment of the present invention.

FIG. 7 is a diagram illustrating first and second spherical wave generation conditions of a scan beam generation unit for forming an interference structure on an object plane according to CASE 3 of FIG. 6.

FIG. 8 is a diagram illustrating a flying-over beam pattern scanning hologram microscope device according to a fourth embodiment of the present invention.

FIG. 9 is a diagram illustrating first and second spherical wave generation conditions of a scan beam generation unit for forming an interference structure on an object plane according to CASE 4 of FIG. 8.

FIGS. 10 to 12 are diagrams illustrating a modification of a light collection unit illustrated in FIG. 1.

BEST MODE

Hereinafter, embodiments of the present invention will be described in detail with reference to the accompanying drawings, so that those of ordinary skill in the art to which the present invention belongs may easily carry out the present invention. However, the present invention may be implemented in various different forms and is not limited to the embodiments described herein. In order to clearly explain the present invention, parts irrelevant to the description are omitted in the drawings, and similar reference numerals are assigned to similar parts throughout the specification.

It will be understood that when a portion is referred to as being "connected to" another portion, it may be "directly connected to" the other portion or "electrically connected to" the other portion with intervening portions therebetween. It will be understood that the terms "comprise," "include," or "have" as used herein specify the presence of stated elements, but do not preclude the presence or addition of one or more other elements.

Hereinafter, embodiments of the present invention will be described in detail with reference to the accompanying drawings, so that those of ordinary skill in the art to which the present invention belongs may easily carry out the present invention. However, the present invention may be implemented in various different forms and is not limited to the embodiments described herein. In order to clearly explain the present invention, parts irrelevant to the description are omitted in the drawings, and similar reference numerals are assigned to similar parts throughout the specification.

It will be understood that when a portion is referred to as being "connected to" another portion, it may be "directly connected to" the other portion or "electrically connected to" the other portion with intervening portions therebetween. It will be understood that the terms "comprise," "include," or "have" as used herein specify the presence of stated elements, but do not preclude the presence or addition of one or more other elements.

The present invention relates to a flying-over beam pattern scanning hologram microscope device, and proposes an optical system structure that projects a beam, which is generated by a scan beam generation unit, onto an object to be scanned, collects light reflected or fluoresced from the object, and transfers the collected light to a photodetector.

According to the present invention, a high-resolution Fresnel zone pattern is formed as a scanning beam pattern on an object plane through an objective lens, the pattern performs a flying-over scan in which the pattern flies over the object, a beam reflected or fluoresced again from the object onto which the scanning beam pattern is irradiated is imaged to a detection plane of a photodetector through the objective lens, thereby forming an image of the object to be scanned, and the intensity of light of the image on the detection plane of the photodetector is spatially condensed.

The present invention largely includes first to fourth embodiments CASE 1 to CASE 4, and the respective embodiments are classified according to the shape of the beam entering the object plane (the plane on which the object is placed).

In the first and second embodiments CASE 1 and CASE 2, a spherical wave and a plane wave interfere with each other and enter the object plane. However, in the first embodiment, a scan beam formed by a converging spherical wave and a plane wave is applied to the object plane, and in the second embodiment, a scan beam formed by a diverging spherical wave and a plane wave is applied to the object plane.

In the third and fourth embodiments CASE 3 and CASE 4, a spherical wave and a spherical wave interfere with each other and enter the object plane. However, in the third embodiment, a scan beam formed by the two diverging spherical waves is applied to the object plane, and in the fourth embodiment, a scan beam formed by a converging spherical wave and a diverging plane wave is applied to the object plane. These four embodiments may be determined differently according to first and second spherical wave generation conditions in the scan beam generation unit.

Hereinafter, a flying-over beam pattern scanning hologram microscope device according to an embodiment of the present invention will be described in more detail with reference to the drawings.

FIG. 1 is a diagram illustrating a flying-over beam pattern scanning hologram microscope device according to a first embodiment of the present invention.

As illustrated in FIG. 1, a flying-over beam pattern scanning hologram microscope device 100 according to a first embodiment of the present invention largely includes a scan beam generation unit 110, a scanning unit 120, a projection unit 130, and a light collection unit 140. This basic structure is also applied to the second to fourth embodiments.

First, the scan beam generation unit 110 frequency-shifts a first beam among first and second beams split by a light source to convert the first beam to a first spherical wave through a first lens 115 and convert the second beam into a second spherical wave through a second lens 116, and interferes the first and second spherical waves to form a scan beam.

The scan beam generation unit 110 uses a Mach-Zehnder interferometer structure that generates the first and second spherical waves by splitting the light source into the first and second beams and then combines the two generated beams again.

The scan beam generation unit 110 includes a light source, a first mirror M1, a first optical splitter 111, a frequency shifting unit 112, second and third mirrors M2 and M3, first and second beam expanders 113 and 114, first and second lenses 115 and 116, and an interference means 117.

The light source is a part that generates electromagnetic waves. The light source may include various means, for example, a laser generator capable of generating electromagnetic waves, a light emitting diode (LED), and a mean for generating a low coherence beam such as a halogen light having a short coherence length. Hereinafter, the light source implemented as the laser generator is taken as a representative example.

The beam output from the light source is transferred to the first mirror M1, reflected, and then input to the first optical splitter 111.

The first optical splitter 111 splits the incident beam into a first beam and a second beam, transfers the first beam to the phase modulation means 112 (acousto-optic modulator), and transfers the second beam to the third mirror M3. That is, the beam following the path of the first beam in the first optical splitter 111 is transferred to the phase modulation means 112, and the beam following the path of the second beam is transferred to the third mirror M3.

Here, the first optical splitter 111 may include an optical fiber coupler, a beam splitter, a geometric phase lens, and the like, and may be implemented in a way of transferring a beam to the outside by guiding a free space. Here, in the case of using a means capable of splitting a beam in-line, such as a geometric phase lens, the beam may be split into a first beam and a second beam in-line. Hereinafter, it is assumed that each optical splitter is implemented as a beam splitter.

The phase modulator 112 frequency-shifts the first beam and transfers the frequency-shifted first beam to the second mirror M2. The phase modulation unit 112 may shift the frequency of the first beam by $\Omega$ by using a frequency generated by a function generator (not illustrated) and transfers the frequency-shifted first beam to the second mirror M2. Here, the phase modulation means 112 may be implemented as various types of modulators that modulate the phase of light according to electrical signals, including an acousto-optic modulator and an electro-optic modulator.

The first beam reflected from the second mirror M2 is expanded by the first beam expander 113 and then transferred to the first lens 115. The second beam reflected from the third mirror M3 is expanded by the second beam expander 114 and then transferred to the second lens 116. The beam expander may be implemented as a collimator.

The first lens 115 is located between the first beam expander 113 and the interference means 117, converts the expanded first beam into a first spherical wave, and transfers the first spherical wave to the interference means 117. That is, the first lens 115 modulates the spatial distribution of the first beam to generate the first spherical wave from the first beam.

The second lens 116 is located between the second beam expander 114 and the interference means 117, converts the expanded second beam into a second spherical wave, and transfers the second spherical wave to the interference means 117. That is, the second lens 116 modulates the spatial distribution of the second beam to generate the second spherical wave from the second beam.

The generated first and second spherical waves interfere with each other while passing through the interference means 117, and are transferred to the scanning unit 120. The interference means 117 may be implemented as a beam splitter.

The interference means 117 overlaps and interferes the first beam (first spherical wave) passing through the first lens 115 and the second beam (second spherical wave) passing through the second lens 116, and forms a scan beam having a Fresnel zone pattern as an interference pattern.

As described above, the scan beam generation unit 110 converts the first and second beams split from the light source into the first and second spherical waves, overlaps the first and second spherical waves through the interference means 117 to form the scan beam, and transfers the formed scan beam to the scanning unit 120.

Next, the configuration of the scanning unit illustrated in FIG. 1 will be described in more detail.

The interference pattern (scan beam) generated between the first and second spherical waves generated by the scan beam generation unit 110 is incident on the scanning unit 120. The beam incident on the scanning unit 120 is transferred to a first lens system 131 of the projection unit 130 via a scan mirror 121 (x-scan mirror).

The scanning unit 120 includes a scan mirror 121 installed at the rear end of the scan beam generation unit 111 to scan the object in the x direction, and a translation stage 122 installed at the rear end of the projection unit 130 to scan the object in they direction, so as to control the scanning position of the scan beam relative to the object in the horizontal and vertical directions.

The scan mirror 121 controls the scan beam incident from the scan beam generation unit 110 in the horizontal direction and transfers the scan beam to the projection unit 130. The translation stage 122 also enables y-direction scanning of the object through the scan beam by directly moving the object receiving the scan beam incident from the rear end of the projection unit 130 in the vertical direction.

The translation stage 122 is implemented so that an object plate on which an object is placed is movable in the y-axis direction, and corresponds to a movable object plate. The translation stage 122 is physically separated from the scan mirror 121, but corresponds to a means for controlling the scanning position of the beam relative to the object. Therefore, the translation stage 122 is included as a component of the scanning unit 120 together with the scan mirror 121.

As described above, the scanning unit 120 controls the scan beam in the horizontal direction (x direction) and the vertical direction (y direction) based on the object by using the scan mirror 121 and the translation stage 122.

In an embodiment of the present invention, the scanning unit 120 uses a mirror scanner. The mirror scanner has an x-scan mirror 121 that scans the object in the x direction (left-and-right direction) around they axis. In the case of the present invention, the scanning unit 140 is not limited to the mirror scanner, and similar means or other known scanning means may be used.

The scanning unit 120 operates by receiving a scan control signal from a scan control unit (not illustrated) within an electronic processing unit (not illustrated). A scan control unit (not illustrated) generates a scan control signal for controlling the scanning position of the scanning unit 120. Here, the scan control signal may include a horizontal scan signal and a vertical scan signal for controlling the scan mirror 121 and the translation stage 122 in the horizontal direction and the vertical direction, respectively.

At this time, the horizontal scan signal is a signal for sequentially moving the scanning position in the horizontal direction (x-axis direction) by a preset distance unit, and has a period T for scan movement in an arbitrary distance unit. The vertical scan signal, which is a signal for moving the translation stage 122 in the vertical direction, is a translation stage control signal enabling the horizontal scan operation for a next y position when the horizontal scan operation in the x-axis direction for an arbitrary y position is completed, and has a period greater than that of the horizontal scan signal.

In response to the control signal, the optical axes of the first spherical wave and the second spherical wave are rotated according to the rotation of the scan mirror 121, and the scan beam pattern having the rotated optical axis is transferred to the first lens system 131 of the projection unit 130.

Here, a half-angle between the non-rotated reference optical axis and the rotated optical axis is referred to as the scan angle ($\theta_s$). For example, it may refer to an angle at which the scan mirror 121 is rotated in a state in which the surface of the scan mirror 121 faces the z-axis direction.

The scanning unit 120 transfers an interference beam (scan beam) between the first and second spherical waves to the projection unit 130 by using the scan mirror 121 and inputs the interference beam to the first lens system 131.

The projection unit 130 includes a first lens system 132, a second lens system 132, and an objective lens 133, which are sequentially disposed between the scanning unit 120 and the object plane, and projects the scan beam received from the scanning unit 120 onto the object plane where the object is located.

The projection unit 130 forms a high-resolution Fresnel zone pattern as a scanning beam pattern on the object plane through the objective lens 133, and performs a flying-over scan in which the pattern flies over the object.

The light collection unit 140 detects the beam that has passes through the objective lens 133 again after fluorescing or being reflected from the object irradiated with the scan beam. At this time, the light collection unit 140 includes a third lens system 142 and a photodetector 143. The light collection unit 140 forms an image of the object by imaging the beam reflected from the object onto the detection plane of the photodetector 143 through the objective lens 133, and spatially integrates and collecting the light intensity of the image imaged onto the detection plane. Here, of course, the detection plane may be located not only on the focal plane of the imaged image but also on the defocused plane of the imaged image.

The light collection unit 140 may collect and detect the intensity of light on the detection plane of the photodetector 143 by generating an electrical signal proportional to the total amount of light. The structure of the light collection unit 140 may have various embodiments. As illustrated in FIG. 1, the light collection unit 140 may be configured by including a second optical splitter 141 disposed between the second lens system 132 and the objective lens 133, and a third lens system 142 and a photodetector 143 disposed behind the third lens system 142.

The beam that fluoresces or is reflected from the object enters the second optical splitter 141 through the objective lens 133, and this beam is reflected through the second optical splitter 141 and transferred to the third lens system 142 and the photodetector 143 located at the upper end.

More various structures of the light collection unit 140 will be described again below. In addition, various structures of the light collection unit may be applied to all the first to fourth embodiments.

Hereinafter, the first to fourth embodiments of the present invention will be described in detail with reference to FIGS. 1, 4, 6, and 8.

In an embodiment of the present invention, the pattern of the scan beam projected on the object plane varies depending on the focal position and conical angle conditions of the first and second spherical waves formed on the scan mirror 121. Accordingly, the present invention is classified into the first to fourth embodiments.

Generation conditions of the first and second spherical waves formed on the scan mirror 121 are different for the first to fourth embodiments (FIGS. 2, 5, 7, and 9). Accordingly, the shapes of the beams actually entering the object plane are also changed (FIGS. 1, 4, 6, and 8).

In the case of the first embodiment of FIG. 1, a converging spherical wave and a plane wave enter the object plane. In the second embodiment of FIG. 4, a diverging spherical wave and a plane wave enter the object plane. In the third embodiment of FIG. 6, two diverging spherical waves enter the object plane. In the fourth embodiment of FIG. 8, a converging spherical wave and a diverging spherical wave enter the object plane.

Therefore, in the embodiment of the present invention, it can be seen that the scan beam projected onto the object plane is determined as one of four interference structures according to the focal position and conical angle conditions of the first and second spherical waves formed on the scan mirror 121.

Specifically, a first interference structure projected onto the object plane is an interference structure (first pattern; CASE 1 in FIG. 1) between the converging spherical wave and the plane wave with respect to the object plane, and a second interference structure is an interference structure between the diverging spherical wave and the plane wave (second pattern; CASE 2 in FIG. 4). In addition, a third interference structure is an interference structure between two diverging spherical waves (third pattern; CASE 3 in FIG. 6), and a fourth interference structure is an interference structure between the converging spherical wave and the diverging spherical wave (fourth pattern; see CASE 4 in FIG. 8).

Next, the spherical wave generation conditions of the scan beam generation unit 110 for implementing CASE 1 to CASE 4 will be described in detail.

[CASE 1] Interference Pattern Between Converging Spherical Wave and Plane Wave FIG. 2 is a diagram illustrating first and second spherical wave generation conditions of the scan beam generation unit for forming the interference structure on the object plane according to CASE 1 of FIG. 1.

In the first embodiment (CASE 1), the first and second spherical waves become the plane wave and the converging spherical wave with respect to the object plane, respectively, and the scan beam projected onto the object plane has an interference structure between the converging spherical wave and the plane wave on the object plane.

As described above, in the case of CASE 1, the structure in which the pattern of the interference beam of the converging spherical wave and the plane wave with respect to the object plane is used as the scan beam pattern for object scanning has a resolution equal to or lower than that of the objective lens, but the depth region in which the object can be located on the object plane is increased.

To this end, the scan beam generation unit 110 generates the first spherical wave and the second spherical wave under the focal length and conical angle conditions illustrated in FIG. 2.

Referring to FIG. 2, in CASE 1, the focal position of the first spherical wave is the same as the position of the entrance pupil of the first lens system 131, and the focal position of the second spherical wave is the same as the position of the entrance pupil of the first lens system 131 or located at the front end of the first lens system 131. In addition, at the same time, CASE 1 has the condition that the conical angle $\theta_1$ of the first spherical wave is equal to or greater than the conical angle $\theta_2$ of the second spherical wave as follows.

$$\theta_1 \geq \theta_2 \qquad \text{[Equation 1]}$$

Here, of course, the focal position and conical angle of each of the first and second spherical waves may be determined according to the specification such as the focal lengths of the first and second lenses 115 and 116 included in the scan beam generation unit 110.

The projection unit 130 transfers the first spherical wave and the second spherical wave, whose optical axes are rotated, received from the scanning unit 120 to the objective lens 133, and the objective lens 133 transfers the received first and second spherical waves to the objective plane of the objective lens 133.

At this time, the entrance pupil of the first lens system 131 is located on the scan plane of the scan mirror 121.

The scan beam formed by the two spherical waves is transferred to the first lens system 131 through the scan mirror 121. The first lens system 131 transfers the received scan beam to the second lens system 132. Here, the entrance pupil of the second lens system 132 is preferably located at the same position as the exit pupil of the first lens system 131. The second lens system 132 transfers the scan beam to the objective lens 133. The objective lens 133 projects the received scan beam onto the object plane. At this time, the position of the entrance pupil of the objective lens 133 is preferably located at the same position as the position of the exit pupil of the second lens system 132.

The first beam converted to the plane wave by the first and second lens systems 131 and 132 having the above-described structure on the object plane on which the object is placed overlaps the second beam converted to the converging spherical wave. At this time, the Fresnel zone plate pattern, which is the interference pattern formed by overlapping the first beam, which is the plane wave, and the second beam, which is the spherical wave, according to the scanning of the scanning unit 120 scans the object while flying over the object.

Here, the extent of the plane wave on the object plane is preferably larger than the extent of the converging spherical wave in order to prevent deterioration of resolution. To this end, the conical angle $\theta_1$ of the first spherical wave in the entrance pupil of the first lens system 131 is greater than or equal to the conical angle $\theta_2$ of the second spherical wave ($\theta_1 \geq \theta_2$).

In addition to the focal position and conical angle conditions (first condition) of the first and second spherical waves illustrated in FIG. 2, it is preferable that the first and second lens systems 131 and 132 satisfy Equation 2 below as a dependent condition thereof.

$$|\theta_1 + \theta_s| \leq |\theta_1^r|_1$$

$$|\theta_2 + \theta_s| \leq |\theta_1^r|$$

$$|r_{sph1}| \leq |f_1 \alpha_1^r|$$

$$|r_{sph2}| \leq |f_1 \alpha_1^r| \qquad \text{[Equation 2]}$$

Here, $\theta_1$ and $\theta_2$ represent the conical angles (convergence half-angles) of the first and second spherical waves, $\theta_s$ represents the scan angle at the scan mirror 121 of the scanning unit 120, $\theta_1^r$ represents the acceptance angle of the first lens system, $f_1$ represents the effective focal length of the first lens system 131, $\alpha_1^r$ represents the convergence angle of the front focal plane of the first lens system 131, and $r_{sph1}$ and $r_{sph2}$ represent radii of the first and second spherical waves on the entrance pupil plane of the first lens system 131.

Here, the extents of the plane wave and the spherical wave projected onto the object plane may be limited according to the size of the entrance pupil of the first lens system 131 and the acceptance angle thereof. In order to prevent the deterioration of the resolution of the hologram and the deterioration of the field of view due to the limitation, the scan angle $\theta_s$ of the scan mirror 121 of the scanning unit 120, the convergence half-angles $\theta_1$ and $\theta_2$ of the respective spherical waves, and the radii $rsph_1$ and $r_{sph2}$ of the respective spherical waves on the entrance pupil plane of the first lens system 131 preferably satisfy Equation 2 above.

Here, the definitions of parameters constituting the lens system may be referred to FIG. 3 below. Each optical system included in the embodiment of the present invention may be modeled in the form of FIG. 3A or 3B.

FIGS. 3A and 3B are diagrams illustrating modeling of a lens system into a general optical system and an aplanatic optical system, respectively.

First, in the case of FIG. 3A, the lens system is modeled with a cardinal point and a cardinal plane of a general optical system, and FIG. 3B is modeled with a cardinal point and a cardinal plane of an aplanatic optical system.

When the first lens system 131 and the second lens system 132 are modeled with the cardinal points and planes of FIG. 3A or 3B, the radius of the entrance pupil for the first lens system 131 is defined as r1, the effective focal length is defined as $f_1$, the acceptance angle is defined as $\theta_1^r$, the radius of the field of view in the front focal plane of the first lens system 131 is defined as $F_1$, and the convergence angle is defined as $\alpha_1^r$.

Similarly, the radius of the entrance pupil for the second lens system 132 is defined as r2, the effective focal length is defined as $f_2$, the acceptance angle is defined as $\theta_2^r$, the radius of the field of view in the front focal plane of the second lens system 132 is defined as $F_2$, and the convergence angle is defined as $\alpha_2{}^r$.

The first lens system 131 transfers, to the second lens system 132, the first spherical wave and the second spherical wave received from the scanning unit 120. At this time, in order to transfer the first spherical wave and the second spherical wave without phase distortion, the entrance pupil of the second lens system 132 is preferably at the same position as the exit pupil of the first lens system 131.

The second lens system 132 transfers the first spherical wave and the second spherical wave received from the first lens system 131 to the objective lens 133 through the second optical splitter 141. At this time, in order to transfer the first spherical wave and the second spherical wave without phase distortion and to cause the first spherical wave to be incident on the object plane of the objective lens as parallel light, the entrance pupil of the objective lens 133 is preferably at the same position as the exit pupil of the second lens system 132.

Here, the radius of the entrance pupil of the objective lens 133 may be defined as $r_0$, the effective focal length may be defined as $f_0$, the acceptance angle may be defined as $\theta_0{}^r$, the radius of the field of view in the front focal plane of the objective lens 133 is defined as $F_0$, and the convergence angle may be defined as $\alpha_0{}^r$.

The first spherical wave that has passed through the first lens system 131, the second lens system 132, and the objective lens 133 becomes a plane wave on the object plane of the objective lens 133. At this time, in order to prevent deterioration of resolution due to scanning, the radius of the plane wave is preferably equal to or smaller than the radius of the field of view of the objective lens 133, and this may be expressed as Equation 3 below.

$$\left|(\theta_1 + \theta_s)\frac{f_0 f_1}{f_2}\right| \leq |F_{obj}| \qquad \text{[Equation 3]}$$

Here, $\theta_1$ represents the convergence half-angle of the first spherical wave, $\theta_s$ represents the scan angle, $F_{obj}$ represents the radius of the field of view in the front focal plane of the objective lens 133, $f_0$ represents the effective focal length of the objective lens 133, and $f_1$ and $f_2$ represent the effective focal lengths of the first and second lens systems.

In addition, the second spherical wave that has passed through the first lens system 131, the second lens system 132, and the objective lens 133 becomes a converging spherical wave on the object plane of the objective lens 133. At this time, in order to prevent deterioration of resolution due to scanning, the radius of the converging spherical wave on the object plane is preferably equal to or smaller than the radius of the field of view of the objective lens 133, and this may be expressed as Equation 4 below.

$$\left|(\theta_2 + \theta_s)\frac{f_0 f_1}{f_2}\right| \leq |F_{obj}| \qquad \text{[Equation 4]}$$

Here, $\theta_2$ represents the convergence half-angle of the second spherical wave, and the remaining parameters are the same as in Equation 3 above.

As described above, in order to implement CASE 1, the conditions of Equations 3 and 4 have to be satisfied together with the conditions of Equation 2.

That is, both the radius of the 'plane wave' on the object plane corresponding to the first spherical wave and the radius of the 'converging spherical wave' on the object plane corresponding to the second spherical wave have to be smaller than or equal to the radius $F_{obj}$ of the field of view of the objective lens 133.

Here, preferably, the first and second lens systems 131 and 132 further satisfy the conditions of Equation 5 below that the optical invariance of the first and second lens systems 131 and 132 is greater than or equal to the optical invariance of the objective lens 133, so as to transfer the scan beam that maximally matches the resolution and viewing angle of the objective lens 133.

$$I_1 \geq I_{obj}, I_2 \geq I_{obj} \qquad \text{[Equation 5]}$$

Here, $I_1$, $I_2$, and $I_{obj}$ represent optical invariance of the first lens system 131, the second lens system 132, and the objective lens 133, respectively.

At this time, when the lenses 131, 132, and 133 are each a lens model according to a first principal approximation, $I_1 = r_1 \tan\theta_1{}' = F_1 \tan\alpha_1{}^r$, $I_2 = r_2 \tan\theta_2{}' = F_1 \tan\alpha_{2hu}{}^r$, $I_{obj} = r_0 \tan\theta_0 = F_0 \tan\alpha_0$, in the case of paraxial approximation model, $I_1 = r_1 \theta_1{}' = F_1 \alpha_1{}^r, I_2 = r_2 \theta_2{}' = F_1 \alpha_2{}^r, I_{obj} = r_0 \theta_0 = F_0 \alpha_0$, and in the case of the aplanatic lens system, $I_1 = r_1 \sin\theta_1{}' = F_1 \sin\alpha_1{}^r, I_2 = r_2 \sin\theta_2{}' = F_1 \sin\alpha_r{}^r$, $I_{obj} = r_0 \sin\theta_0 = F_0 \sin\alpha_0$. Here, it is assumed that the lens system exists in free space, but when the lens system exists in a medium having a refractive index of n, the optical invariance is n times.

[CASE 2] Interference Pattern Between Diverging Spherical Wave and Plane Wave

FIG. 4 is a diagram illustrating a flying-over beam pattern scanning hologram microscope device according to a second embodiment of the present invention, and FIG. 5 is a diagram illustrating first and second spherical wave generation conditions of a scan beam generation unit for forming an interference structure on an object plane according to CASE 2 of FIG. 4.

As illustrated in FIG. 4, a flying-over beam pattern scanning hologram microscope device 200 according to a second embodiment of the present invention largely includes a scan beam generation unit 210, a scanning unit 120, a projection unit 130, and a light collection unit 140. Redundant descriptions of components denoted by the same reference numerals as those in FIG. 1 will be omitted.

As described above, in the case of the second embodiment, the basic structure of the device is the same as that of the first embodiment, but the generated scan beam pattern is different from that of the first embodiment. That is, conditions of the first and second spherical waves derived through first and second lenses 215 and 216 of the scan beam generation unit 210 are different, and the principle is as follows.

In the second embodiment (CASE 2), the first and second spherical waves become the plane wave and the diverging spherical wave with respect to the object plane, respectively, and the scan beam projected onto the object plane has an interference structure between the diverging spherical wave and the plane wave on the object plane.

As described above, in the case of CASE 2, the structure in which the pattern of the interference beam of the diverging spherical wave and the plane wave with respect to the object plane is used as the scan beam pattern for object scanning has a resolution equal to or higher than that of the objective lens.

To this end, the scan beam generation unit 210 generates the first spherical wave and the second spherical wave under the focal length and conical angle conditions as illustrated in FIG. 5.

In the case of FIG. 5, the focal position of the first spherical wave is the same as the position of the entrance pupil of the first lens system 131, and the focal position of the second spherical wave is longer than the focal position of the first spherical wave, so as to be located at the same position as the entrance pupil of the first lens system 131 or behind the entrance pupil of the first lens system 131. At the same time, the conical angles $\theta_1$ and $\theta_2$ of the first and second spherical waves satisfy $\theta_1 \geq \theta_2$.

The scan beam formed by the two spherical waves is transferred to the first lens system 131 through the scanning unit 120. The first lens system 131 transfers the received scan beam to the second lens system 132. The entrance pupil of the second lens system 132 is located at the same position as the exit pupil of the first lens system 131. The second lens system 132 transfers the scan beam to the objective lens 133. The objective lens 133 projects the received scan beam onto the object plane. At this time, the position of the entrance pupil of the objective lens 133 is located at the same position as the position of the exit pupil of the second lens system 132.

The first beam converted to the plane wave by the first and second lens systems 131 and 132 having the above-described structure on the object plane on which the object is placed overlaps the second beam converted to the diverging spherical wave. At this time, the Fresnel zone plate pattern, which is the interference pattern formed by overlapping the first beam, which is the plane wave, and the second beam, which is the spherical wave, according to the scanning of the scan mirror scans the object while flying over the object.

Here, in order to prevent deterioration of resolution, the extent of the plane wave, which is the first beam, is preferably larger than the extent of the diverging spherical wave on the object plane. To this end, as in Equation 1 above, it is preferable to satisfy the condition that the conical angle $\theta_1$ of the first spherical wave is equal to or greater than the conical angle $\theta_2$ of the second spherical wave.

The remaining conditions (Equations 2 to 5) of the second embodiment (Case 2) are applied in the same manner as in the first embodiment (CASE 1).

However, in the second embodiment, the first spherical wave having passed through the first lens system 131, the second lens system 132, and the objective lens 133 becomes a plane wave on the object plane of the objective lens 133, and the second spherical wave having passed through the first lens system 131, the second lens system 132, and the objective lens 133 becomes a diverging spherical wave on the object plane of the objective lens 133.

Therefore, in the case of the second embodiment, Equations 3 and 4 mean that both the radius of the 'plane wave' on the object plane corresponding to the first spherical wave and the radius of the 'diverging spherical wave' on the object plane corresponding to the second spherical wave have to be smaller than or equal to the radius $F_{obj}$ of the field of view of the objective lens 133.

[CASE 3] Interference Pattern Between Diverging Spherical Wave and Diverging Spherical Wave FIG. 6 is a diagram illustrating a flying-over beam pattern scanning hologram microscope device according to a third embodiment of the present invention, and FIG. 7 is a diagram illustrating first and second spherical wave generation conditions of a scan beam generation unit for forming an interference structure on an object plane according to CASE 3 of FIG. 6.

As illustrated in FIG. 6, a flying-over beam pattern scanning hologram microscope device 300 according to a third embodiment of the present invention largely includes a scan beam generation unit 310, a scanning unit 120, a projection unit 130, and a light collection unit 140. Redundant descriptions of components denoted by the same reference numerals as those in FIG. 1 will be omitted.

As described above, in the case of the third embodiment, the basic structure of the device is the same as that of the first embodiment, but the generated scan beam pattern is different from that of the first embodiment. That is, conditions of the first and second spherical waves derived through first and second lenses 315 and 316 of the scan beam generation unit 310 are different, and the principle is as follows.

In the third embodiment (CASE 3), both the first and second spherical waves become the diverging spherical waves with respect to the object plane, and the scan beam projected onto the object plane has an interference structure between the two diverging spherical wave on the object plane.

As described above, in the case of CASE 3, the structure in which the pattern of the interference beam of the diverging spherical waves with respect to the object plane is used as the scan beam pattern for object scanning is characterized in that the depth of field is increased.

To this end, the scan beam generation unit 310 generates the first spherical wave and the second spherical wave under the focal length and conical angle conditions illustrated in FIG. 7.

In the case of FIG. 7, the focal position of the first spherical wave is located behind the entrance pupil of the first lens system 131, and the focal position of the second spherical wave is longer than the focal position of the first spherical wave and is located further behind the focal position of the first spherical wave. At the same time, the conical angles $\theta_1$ and $\theta_2$ of the first and second spherical waves have a condition that satisfies $\theta_1 \geq \theta_2$.

The scan beam formed by the two spherical waves is transferred to the first lens system 131 through the scanning unit 120. The first lens system 131 transfers the received scan beam to the second lens system 132. The entrance pupil of the second lens system 132 is located at the same position as the exit pupil of the first lens system 131. The second lens system 132 transfers the scan beam to the objective lens 133. The objective lens 133 projects the received scan beam onto the object plane. At this time, the position of the entrance pupil of the objective lens 133 is located at the same position as the position of the exit pupil of the second lens system 132.

The first beam converted to the diverging spherical wave by the first and second lens systems 131 and 132 having the above-described structure on the object plane on which the object is placed overlaps the second beam converted to the diverging spherical wave. At this time, the Fresnel zone plate pattern, which is the interference pattern formed by overlapping the first beam, which is the spherical wave, and the second beam, which is the spherical wave, according to the scanning of the scan mirror scans the object while flying over the object.

Here, in order to prevent deterioration of resolution, the extent of the spherical wave, which is the first beam, is preferably larger than the extent of the spherical wave, which is the second beam, on the object plane. To this end, as in Equation 1 above, it is preferable to satisfy the condition that the conical angle $\theta_1$ of the first spherical wave is equal to or greater than the conical angle $\theta_2$ of the second spherical wave.

The remaining conditions (Equations 2 to 5) of the third embodiment (Case 3) are the same as in the first embodiment (CASE 1). At this time, in order to transfer the first spherical wave and the second spherical wave without phase distortion and to cause the first spherical wave to be incident on the object plane of the objective lens as the spherical wave, the entrance pupil of the objective lens 133 is preferably at the same position as the exit pupil of the second lens system 132.

However, in the case of the third embodiment, the first spherical wave that has passed through the first lens system 131, the second lens system 132, and the objective lens 133 becomes a 'diverging spherical wave' on the object plane of the objective lens 133. In addition, the second spherical wave that has passed through the first lens system 131, the second lens system 132, and the objective lens 133 also becomes a 'diverging spherical wave' on the object plane of the objective lens 133.

Therefore, in the case of the third embodiment, Equations 3 and 4 mean that both the radius of the 'diverging spherical wave' on the object plane corresponding to the first spherical wave and the radius of the 'diverging spherical wave' on the object plane corresponding to the second spherical wave have to be smaller than or equal to the radius $F_{obj}$ of the field of view of the objective lens 133.

[CASE 4] Interference Pattern Between Converging Spherical Wave and Diverging Spherical Wave FIG. 8 is a diagram illustrating a flying-over beam pattern scanning hologram microscope device according to a fourth embodiment of the present invention, and FIG. 9 is a diagram illustrating first and second spherical wave generation conditions of a scan beam generation unit for forming an interference structure on an object plane according to CASE 4 of FIG. 8.

As illustrated in FIG. 8, a flying-over beam pattern scanning hologram microscope device 400 according to a fourth embodiment of the present invention largely includes a scan beam generation unit 410, a scanning unit 120, a projection unit 130, and a light collection unit 140. Redundant descriptions of components denoted by the same reference numerals as those in FIG. 1 will be omitted.

As described above, in the case of the fourth embodiment, the basic structure of the device is the same as that of the first embodiment, but the generated scan beam pattern is different from that of the first embodiment. That is, conditions of the first and second spherical waves derived through first and second lenses 415 and 416 of the scan beam generation unit 410 are different, and the principle is as follows.

In the fourth embodiment (CASE 4), the first and second spherical waves become the converging spherical wave and the diverging spherical wave with respect to the object plane, respectively, and the scan beam projected onto the object plane has an interference structure between the converging spherical wave and the diverging spherical wave on the object plane.

As described above, in the case of CASE 4, the structure in which the pattern of the interference beam of the converging spherical wave and the diverging spherical wave on the object plane is used as the scan beam pattern for object scanning is characterized in that the resolution is more increased than the resolution of the objective lens.

To this end, the scan beam generation unit 410 generates the first spherical wave and the second spherical wave under the focal length and conical angle conditions illustrated in FIG. 9.

Referring to FIG. 9, the focal position of the first spherical wave is located in front of the entrance pupil of the first lens system 131, and the focal position of the second spherical wave is located further behind the entrance pupil of the first lens system 131. In addition, at the same time, the conical angles $\theta_1$ and $\theta_2$ of the first and second spherical waves satisfy $\theta_2 < \theta_1$.

The scan beam formed by the two spherical waves is transferred to the first lens system 131 through the scanning unit 120. The first lens system 131 transfers the received scan beam to the second lens system 132. The entrance pupil of the second lens system 132 is located at the same position as the exit pupil of the first lens system 131. The second lens system 132 transfers the scan beam to the objective lens 133. The objective lens 133 projects the received scan beam onto the object plane. At this time, the position of the entrance pupil of the objective lens 133 is located at the same position as the position of the exit pupil of the second lens system 132.

The first beam converted to the converging spherical wave by the first and second lens systems 131 and 132 having the above structure on the object plane on which the object is placed overlaps the second beam converted to the diverging spherical wave. At this time, the Fresnel zone plate pattern, which is the interference pattern formed by overlapping the first beam, which is the spherical wave, and the second beam, which is the spherical wave, according to the scanning of the scan mirror scans the object while flying over the object.

At this time, the extent of the spherical wave, which is the first beam, is preferably greater than the extent of the spherical wave, which is the second beam, on the object plane in order to prevent deterioration of resolution. To this end, as shown in Equation 6 below, the absolute value of the difference between the conical angle $\theta_1$ of the first spherical wave and the conical angle $\theta_2$ of the second spherical wave is preferably smaller than ½ of the absolute value of the sum of the conical angle $\theta_1$ of the first spherical wave and the conical angle $\theta_2$ of the second spherical wave.

$$|\theta_2 - \theta_1| < \frac{1}{2}|\theta_2 + \theta_1| \qquad \text{[Equation 6]}$$

In addition to the focal position and conical angle conditions (fourth condition) of the two spherical waves illustrated in FIG. 8, the first and second lens systems 131 and 132 have to satisfy Equation 7 below as a dependent condition thereof.

$|\theta_s - \theta_1| \leq |\theta_1^r|$ $|\theta_2 + \theta_s| \leq |\theta_1^r|$ $r_{sph1} \leq f_1 \alpha_1^r$ $r_{sph2} \leq f_1 \alpha_1^r \qquad \text{[Equation 7]}$ Here, $\theta_1$ and $\theta_2$ represent the conical angles (convergence half-angles) of the first and second spherical waves, $\theta_s$ represents the scan angle at the scan mirror 121, $\theta_1^r$ represents the acceptance angle of the first lens system 131, $f_1$ represents the effective focal length of the first lens system 131, $\alpha_1^r$ represents the convergence angle of the front focal plane of the first lens system 131, and rsph$_1$ and r$_{sph2}$ represent radii of the first and second spherical waves on the entrance pupil plane of the first lens system 131.

In order to prevent deterioration of resolution and deterioration of field of view due to limitations on the contents of the two spherical waves projected onto the object plane according to the size of the entrance pupil of the first lens system 131 and the acceptance angle, the radii rsph$_1$ and r$_{sph2}$ of the first and second spherical waves on the entrance pupil plane of the first lens system 131 preferably satisfy Equation 7.

The first lens system 131 transfers, to the second lens system 132, the first spherical wave and the second spherical wave received from the scanning unit 120. At this time, in order to transfer the first spherical wave and the second spherical wave without phase distortion, the entrance pupil of the second lens system 132 is preferably at the same position as the exit pupil of the first lens system 131.

The second lens system 132 transfers the first spherical wave and the second spherical wave received from the first lens system 131 to the objective lens 133 through the second optical splitter 141. At this time, in order to transfer the first spherical wave and the second spherical wave without phase distortion and to cause the first spherical wave to be incident on the object plane of the objective lens as the spherical wave, the entrance pupil of the objective lens 133 is preferably at the same position as the exit pupil of the second lens system 132.

In addition, in the fourth embodiment, the first spherical wave that has passed through the first lens system 131, the second lens system 132, and the objective lens 133 becomes a converging spherical wave on the object plane of the objective lens 133. At this time, in order to prevent deterioration of resolution due to scanning, the radius of the spherical wave is preferably equal to or smaller than the radius of the field of view of the objective lens 133, and this may be expressed as Equation 8 below.

$$\left| (\theta_1 - \theta_s) \frac{f_0 f_1}{f_2} \right| \leq |F_{obj}| \quad \text{[Equation 8]}$$

Here, $\theta_1$ represents the convergence half-angle of the first spherical wave, $\theta_s$ represents the scan angle, $F_{obj}$ represents the radius of the field of view in the front focal plane of the objective lens 133, $f_0$ represents the effective focal length of the objective lens 133, and $f_1$ and $f_2$ represent the effective focal lengths of the first and second lens systems.

In addition, the second spherical wave that has passed through the first lens system 131, the second lens system 132, and the objective lens 133 becomes a 'diverging spherical wave' on the object plane of the objective lens 133. At this time, in order to prevent deterioration of resolution due to scanning, the radius of the diverging spherical wave on the object plane is preferably equal to or smaller than the radius of the field of view of the objective lens 133, and this may be expressed as Equation 9 below.

$$\left| (\theta_2 + \theta_s) \frac{f_0 f_1}{f_2} \right| \leq |F_{obj}| \quad \text{[Equation 9]}$$

Here, $\theta_2$ represents the convergence half-angle of the second spherical wave, and the remaining parameters are the same as in Equation 3 above.

Therefore, in the case of the fourth embodiment, both the radius of the 'converging spherical wave' on the object plane corresponding to the first spherical wave and the radius of the 'diverging spherical wave' on the object plane corresponding to the second spherical wave have to be smaller than or equal to the radius $F_{obj}$ of the field of view of the objective lens 133.

As shown in Equation 5, the fourth embodiment also has a condition that the optical invariance of the first and second lens systems 131 and 132 is equal to or greater than the optical invariance of the objective lens 133.

On the other hand, in all the embodiments of FIGS. 1, 4, 6, and 8, the first lens system and the second lens system may be implemented as general lenses, plano-convex lenses, doublets, and compound achromatic doublets, and is preferably a telecentric lens system in order to minimize optical axis distortion due to scanning.

Accordingly, the first lens system and the second lens system may include a Plossl-type eye lens of U.S. Pat. No. 4,482,217 and may include a telecentric lens. In addition, the first lens system may include a compound scan lens and the second lens system may include a compound tube lens.

Next, the structure of the light collection unit commonly applicable to the first to fourth embodiments will be described in more detail with reference to FIG. 1. Since the configuration of the light collection unit illustrated in the invention of the first embodiment of FIG. 1 is commonly applicable to the second to fourth embodiments, FIG. 1 will be described below as a representative example.

[Light Collection Unit] Spatial Plane Light Collecting Method

Referring to FIG. 1, the scan beam pattern generated by the scan beam generation unit 110 is changed to a high-resolution Fresnel zone pattern through the objective lens 133, and irradiates the object at a designated scan position according to the rotation of the scan mirror. The irradiated beam pattern is reflected from the object and transferred to the objective lens 133. The objective lens 133 transfers the reflected beam to the third lens system 142 through the second optical splitter 141.

As described above, the light collection unit 140 of FIG. 1 includes a second optical splitter 141, a third lens system 142, and a photodetector 143, and performs spatial light collection.

The second optical splitter 141 is disposed between the second lens system 132 and the objective lens 133, transfers the beam having passed through the second lens system 132 to the objective lens 133, and reflects the beam reflected from the object and passing through the objective lens 133 to the third lens system 142. The photodetector 143 detects the beam having passed through the third lens system 142 and may be implemented as a photodetector.

The third lens system 142 receives the beam reflected by the optical splitter 141 and transfers the beam to the photodetector 143. Here, the radius of the entrance pupil of the third lens system 142 may be defined as $r_3$, the effective focal length may be defined as $f_3$, the acceptance angle may be defined as $\theta_3{}^r$, the radius of the field of view in the front focal plane of the third lens system 142 may be defined as $F_3$, and the convergence angle may be defined as $\alpha_3{}^r$.

The objective lens 133 and the third lens system 142 generate the image of the object irradiated with the Fresnel zone plate in the direction of the detection plane of the photodetector 143 at a designated scan position according to the rotation of the scan mirror. In this case, when the objective lens 133 is an infinitely corrected objective lens, the position of the entrance pupil of the third lens system 142 is preferably the same as the position of the entrance pupil of the objective lens 133. The image of the object irradiated by the scan beam pattern is formed at the position of the exit pupil of the third lens system 142.

Here, the detection plane of the photodetector 143 is preferably located at the position where the image is formed, the size of the detection plane of the photodetector 143 is preferably equal to or larger than the size of the image on the detection plane of the reflected beam in the entire area irradiated by the scan beam according to scanning, and the irradiated area does not exceed the field of view of the objective lens 133.

Therefore, in the structure of the light collection unit 140 illustrated in FIG. 1, the size $F_{pd}$ of the detection plane of the photodetector 143 preferably satisfies Equation 10 below.

$$\left|\frac{\theta_s f_1 f_3}{f_2}\right| \le |F_{pd}| \text{ or } \left|\frac{F_0 f_3}{f_0}\right| \le |F_{pa}| \qquad \text{[Equation 10]}$$

Here, $\theta_s$ represents the scan angle at the scan mirror 121 of the scanning unit 120, $f_1$ to $f_3$ represent the effective focal lengths of the first to third lens systems 131, 132, and 142, $f_0$ represents the effective focal length of the objective lens 133, and $F_o$ represents the radius of the field of view in the front focal plane of the objective lens 133.

The photodetector 143 generates an electrical signal proportional to the sum of light intensities on the detection plane and transfers the electrical signal to an electronic processing unit (not illustrated). The electronic processing unit (not illustrated) processes the electrical signal detected by the photodetector 143 to generate a hologram of the object.

The electronic processing unit (not illustrated) according to each structure may be different, and this may refer to Korean Patent Application No. 10-2012-0002121, which was previously filed by the present applicant.

For example, the electronic processing unit (not illustrated) may include a heterodyne detector, an AD converter, a signal processing unit, a storage unit, and a scan control unit. The heterodyne detector may generate an in-phase output signal and a quadrature phase output signal by using an electric signal received from the photodetector and a heterodyne modulation signal having a frequency Ω generated by a function generator.

The AD converter receives the in-phase signal and the quadrature phase signal through each channel and converts the in-phase signal and the quadrature phase signal into digital signals. The converted digital current signal is provided to the signal processing unit together with the scanning position of the scanning unit. The signal processing unit generates a complex hologram of an object from the converted digital signal, and the storage unit stores the generated complex hologram. The scan control unit generates a control signal for changing the scanning position of the scanning means whenever hologram processing is completed on a certain position of the object, and transfers the control signal to the scanning unit 120.

In FIG. 1, the position of the detection plane is the position of the exit pupil of the third lens system 142 and is preferably the image plane of the object. However, the position of the detection plane is not necessarily limited thereto, and may be located on the front and rear sides of the image plane. Even in this case, the size of the detection plane preferably satisfies Equation 10.

On the other hand, as the best mode, the embodiment of the present invention has been described as transferring the scan beam by using the first lens system 131 and the second lens system 132, as illustrated in FIG. 1. However, in FIG. 1, the present invention may include the scanning unit 120, the second optical splitter 141, the objective lens 133, and the third lens system 142, without the first lens system 131 and the second lens system 132. In such a structure, the size of the detection plane preferably satisfies Equation 11.

$$|\theta_s f_3| \le |F_{pd}| \text{ or } \left|\frac{F_0 f_3}{f_0}\right| \le |F_{pd}| \qquad \text{[Equation 11]}$$

In the embodiment of the present invention, as illustrated in FIG. 1, the object image is generated on the detection plane by using the objective lens 133 and the third lens system 142 in the best mode. However, of course, the object image may be formed on the detection plane by using only the objective lens 133 without the third lens system 142.

In addition, in the embodiment of the present invention, the second optical splitter 141 is positioned between the second lens system 132 and the objective lens 133 in the best mode. However, the present invention is not necessarily limited thereto, and modified structures (total of three structures) as illustrated in FIGS. 10 to 12 below may be additionally proposed.

FIGS. 10 to 12 illustrate first to third modifications of the light collection unit illustrated in FIG. 1. Of course, the modified structures of the light collection unit illustrated in FIGS. 10 to 12 also correspond to the structures applicable to all of the first to fourth embodiments of the present invention.

First, in the case of the first modification of FIG. 10, the light collection unit 150 includes a second optical splitter 151, a third lens system 152, a fourth lens system 153, and a photodetector 154. At this time, unlike FIG. 1, the second optical splitter 151 is positioned between the first lens system 131 and the second lens system 132 and forms an image on the detection plane of the photodetector 154 by using the third lens system 152 and the fourth lens system 153.

That is, the second optical splitter 151 is disposed between the first lens system 131 and the second lens system 132, transfers a beam passing through the first lens system 131 to the second lens system 132, and reflects a beam reflected from an object and passed through the second lens system 132 through the objective lens 133 back to the third lens system 152.

The third lens system 152 receives the beam reflected by the optical splitter and transfers the received beam to the fourth lens system 153. The fourth lens system 153 receives the beam passing through the third lens system 152 and transfers the received beam to the photodetector 154. Then, the photodetector 154 detects the beam passing through the fourth lens system 153.

Of course, the radii of the entrance pupils of the third and fourth lens systems 152 and 153 may be defined as $r_3$ and $r_4$, the effective focal lengths may be defined as $f_3$ and $f_4$, the acceptance angle may be defined as $\theta_3^r$, $\theta_4^r$, the radii of the field of view in each front focal plane may be defined as $F_3$ and $F_4$, and the convergence angle may be defined as $\alpha_3^r$, $\alpha_4^r$.

In the structure of the light collection unit 150 as illustrated in FIG. 10, the size $F_{pd}$ of the detection plane of the photodetector 154 preferably satisfies Equation 12 below.

$$\left|\frac{\theta_s f_1 f_4}{f_3}\right| \le |F_{pd}| \text{ or } \left|\frac{F_0 f_2 f_4}{f_0 f_3}\right| \le |F_{pd}|. \qquad \text{[Equation 12]}$$

Here, $F_{pd}$ represents the size of the detection plane of the photodetector 154, $\theta_s$ represents the scan angle at the scan mirror 121 of the scanning unit 120, $f_1$ to $f_4$ represent the effective focal lengths of the first to fourth lens systems 132, 132, 152, and 153, $f_0$ represents the effective focal length of the objective lens 133, and $F_o$ represents the radius of the field of view in the front focal plane of the objective lens 133.

In the case of the light collection units 140 and 150 described above with reference to FIGS. 1 and 10, a method using a spatial plane light collecting technique is shown. Unlike this, the light collection units 160 and 170 illustrated in FIGS. 11 and 12 below correspond to a method using a spatial frequency plane light collecting method.

[Light Collection Unit] Spatial Frequency Plane Light Collecting Method

First, in the case of the second modification of FIG. 11, the light collection unit 160 includes a second optical splitter 161, a third lens system 162, a fourth lens system 163, and a photodetector 164. Unlike FIG. 1, it can be seen that a fourth lens system is added between the third lens system and the photodetector.

The scan beam pattern generated by the scan beam generation unit 120 is changed to a high-resolution Fresnel zone pattern through the objective lens 133 and irradiates the object at a designated scan position according to the rotation of the scan mirror. The irradiated beam pattern is reflected from the object and transferred to the objective lens 133.

That is, the second optical splitter 161 transfers the beam passing through the second lens system 131 to the objective lens 133, and reflects the beam reflected from the object and passing through the objective lens 133 to the third lens system 162. The third lens system 162 receives the reflected beam and transfers the received beam to the fourth lens system 163, and the fourth lens system 163 transfers the received beam to the detection plane of the photodetector 164.

At this time, it is preferable that the exit pupil of the objective lens 133 and the entrance pupil of the third lens system 162 are located on the same plane, the exit pupil of the third lens system 162 is located at the same position as the entrance pupil of the fourth lens system 163, and the detection plane of the photodetector 164 is located at the exit pupil of the fourth lens system 163. That is, it is preferable to locate the objective lens 133, the third lens system 162, and the fourth lens system 163 as an afocal system.

A spatial frequency-converted light distribution of an image on the object plane of the objective lens 133 is generated on the photodetection plane of the photodetector 164 having the photodetection structure.

At this time, as shown in Equation 13 below, the size $F_{pd}$ of the detection plane of the photodetector is preferably greater than or equal to 0.1 times the product of the effective numerical aperture of the scan beam transferred to the object plane and the focal length of the fourth lens system 163.

$$|0.1 f_4 NA_{eff}| \le |F_{pd}| \qquad \text{[Equation 13]}$$

Here, $f_4$ is defined as the effective focal length of the fourth lens system 163, and $NA_{eff}$ is the effective numerical aperture of the beam transferred to the object plane and is defined as the difference $NA_{eff}=|NA_1-NA_2|$ between the numerical aperture $NA_1$ of the first spherical wave transferred to the object plane and the numerical aperture $NA_2$ of the second spherical wave.

At this time, $NA_1=\sin(\Omega_1)$ and $NA_2=\sin(\Omega_2)$. $\Omega 1$ and $\Omega 2$ are the divergence angles of the beam viewed from the object plane. In the case of a diverging spherical wave with positive divergence, $\Omega 1$ and $\Omega 2$ are positive divergence angles. In the case of a converging spherical wave with negative divergence, $\Omega 1$ and $\Omega 2$ are negative divergence angles. In the case of the plane wave, $\Omega 1$ and $\Omega 2$ are 0.

In the case of the first embodiment (CASE 1) of FIG. 1, since the first spherical wave is a plane wave on the object plane, $NA_1=0$, and since the second spherical wave is a converging spherical wave on the object plane, $$NA_2 = -\sin\left(\frac{f_2 r_{sph2}}{f_0 f_1}\right).$$

In the second embodiment (CASE 2) of FIG. 4, since the first spherical wave is a plane wave on the object plane, $NA_1=0$, and since the second spherical wave is a diverging spherical wave on the object plane, $$NA_2 = \sin\left(\frac{f_2 r_{sph2}}{f_0 f_1}\right).$$

In the third embodiment (CASE 3) of FIG. 6, since the first spherical wave is a diverging spherical wave on the object plane, $$NA_1 = \sin\left(\frac{f_2 r_{sph1}}{f_0 f_1}\right),$$

and since the second spherical wave is a diverging spherical wave on the object plane, $$NA_2 = \sin\left(\frac{f_2 r_{sph2}}{f_0 f_1}\right).$$

In the fourth embodiment (CASE 4) of FIG. 8, since the first spherical wave is a converging spherical wave on the object plane, $$NA_1 = -\sin\left(\frac{f_2 r_{sph1}}{f_0 f_1}\right),$$

and since the second spherical wave is a diverging spherical wave on the object plane, $$NA_2 = \sin\left(\frac{f_2 r_{sph2}}{f_0 f_1}\right).$$

Next, in the case of the fourth modification of FIG. 12, the light collection unit 170 includes a second optical splitter 171, a third lens system 172, and a photodetector 173. At this time, unlike FIG. 1, the second optical splitter 171 is located between the first lens system 131 and the second lens system 132.

The scan beam pattern generated by the scan beam generation unit 120 is changed to a high-resolution Fresnel zone pattern through the objective lens 133 and irradiates the object at a designated scan position according to the rotation of the scan mirror. The irradiated beam pattern is reflected from the object and transferred to the objective lens 133.

The objective lens 133 transfers the reflected beam to the second optical splitter 171 through the second lens system 132. The second optical splitter 171 reflects the received beam back to the third lens system 172, and the third lens system 172 receives the beam and transfers the received beam to the detection plane of the photodetector 173.

At this time, it is preferable that the exit pupil of the objective lens 133 and the entrance pupil of the second lens system 132 are located on the same plane, the exit pupil of the second lens system 132 is located at the same position as the entrance pupil of the third lens system 172, and the detection plane of the photodetector 164 is located at the exit pupil of the third lens system 172. That is, it is preferable to locate the objective lens 133, the second lens system 132, and the third lens system 172 as an afocal system.

A spatial frequency-converted light distribution of an image on the object plane of the objective lens 133 is generated on the photodetection plane of the photodetector 173 having the photodetection structure.

At this time, as shown in Equation 14 below, the size $F_{pd}$ of the detection plane of the photodetector is preferably greater than or equal to 0.1 times the product of the effective numerical $NA_{eff}$ of the scan beam transferred to the object plane and the focal length $f_3$ of the third lens system 172.

$$|0.1 f_3 NA_{eff}| \leq |F_{pd}|$$ [Equation 14]

In such the structure, in the case of the first embodiment (CASE 1) of FIG. 1, since the first spherical wave is a plane wave on the object plane, $NA_1=0$, and since the second spherical wave is a converging spherical wave on the object plane, $$NA_2 = -\sin\left(\frac{f_2 r_{sph2}}{f_0 f_1}\right).$$

In the second embodiment (CASE 2) of FIG. 4, since the first spherical wave is a plane wave on the object plane, $NA_1=0$, and since the second spherical wave is a diverging spherical wave on the object plane, $$NA_2 = \sin\left(\frac{f_2 r_{sph2}}{f_0 f_1}\right).$$

In the third embodiment (CASE 3) of FIG. 6, since the first spherical wave is a diverging spherical wave on the object plane, $$NA_1 = \sin\left(\frac{f_2 r_{sph1}}{f_0 f_1}\right),$$

and since the second spherical wave is a diverging spherical wave on the object plane, $$NA_2 = \sin\left(\frac{f_2 r_{sph2}}{f_0 f_1}\right).$$

In the fourth embodiment (CASE 4) of FIG. 8, since the first spherical wave is a converging spherical wave on the object plane, $$NA_1 = -\sin\left(\frac{f_2 r_{sph1}}{f_0 f_1}\right),$$

and since the second spherical wave is a diverging spherical wave on the object plane, $$NA_2 = \sin\left(\frac{f_2 r_{sph2}}{f_0 f_1}\right).$$

On the other hand, taking the structure of FIG. 1 as an example, when the object is a phosphor, a dichroic mirror may be used instead of the second optical splitter 141. The dichroic mirror may be disposed between the scanning unit 120 and the phosphor, and may transfer an interference beam incident by the scanning unit 120, transfer the interference beam to the phosphor, reflect a fluorescent beam incident from the phosphor, and transfer the fluorescent beam to the photodetector 164. The dichroic mirror is a light transfer unit, and transfers the fluorescent beam emitted from the phosphor to the photodetector in the process of scanning the phosphor. The dichroic mirror is inclined at a set angle between the scanning unit and the phosphor. The dichroic mirror is a mirror designed to selectively reflect light according to a wavelength. In the present embodiment, the dichroic mirror may be designed to transfer the interference beam and reflect the fluorescent beam. That is, the dichroic mirror transmits the interference beam incident by the scanning unit and transfers the interference beam to the phosphor, and the dichroic mirror reflects the fluorescent beam incident from the phosphor and transfers the fluorescent beam to the photodetector. As described above, the dichroic mirror is designed to transmit the wavelength of the interference beam and reflect the wavelength of the fluorescent beam emitted from the phosphor. Here, of course, the wavelength range of each of the interference beam and the fluorescent beam corresponds to a value known in advance.

According to this, the interference beam (interference pattern) for scanning the phosphor is transmitted through the dichroic mirror and transferred to the phosphor. In addition, the fluorescent beam emitted from the phosphor during scanning is reflected immediately upon reaching the dichroic mirror and transferred to the photodetector through the third lens system.

According to the present invention as described above, the high-resolution Fresnel zone pattern is formed as the scanning beam pattern on the object plane through the objective lens, and the beam reflected from the object is imaged on the detection plane of the photodetector through the objective lens while the flying-over scan is performed, thereby implementing a high-resolution scanning hologram microscope at high speed.

The present invention has been described with reference to the embodiments illustrated in the drawings, but this is only an example. It will be understood by those of ordinary skill in the art that various modifications and equivalents thereto may be made thereto. Accordingly, the true technical protection scope of the present invention should be defined by the technical spirit of the appended claims.

The invention claimed is:

1. A flying-over beam pattern scanning hologram microscope device comprising:
   a scan beam generation unit which modulates a phase of a first beam split from a light source to convert the first beam to a first spherical wave through a first lens, converts a second beam to a second spherical wave through a second lens, and then allows the first and second spherical waves to interfere with each other to form a scan beam
   a scanning unit which comprises a scan mirror for controlling the incident scan beam in a horizontal direction to be transferred to a projection unit, so as to control a scanning position of the scan beam for an object in horizontal and vertical directions, and a translation stage for moving the object in a vertical direction at a rear end of the projection unit;
   the projection unit which comprises multiple lens systems and an objective lens, and projects the scan beam transferred from the scanning unit onto an object plane on which the object is placed; and
   a light collection unit which detects a beam that has passed through the objective lens again after fluorescing or being reflected from an object,
   wherein the scan beam projected onto the object plane has different patterns according to focal position and conical angle conditions of each of the first and second spherical waves formed on the scan mirror, and
   wherein the scan beam projected onto the object plane is determined as one of an interference structure between a converging spherical wave and a plane wave on the object plane according to focal position and conical angle conditions of each of the first and second spherical waves formed on the scan mirror, an interference structure between a diverging spherical wave and a plane wave on the object plane, an interference structure between two diverging spherical waves on the object plane, and an Interference structure between a converging spherical wave and a diverging spherical wave on the object plane.

2. The flying-over beam pattern scanning hologram microscope device of claim 1, wherein the projection unit comprises a first lens system, a second lens system, and the objective lens, which are sequentially disposed between the scanning unit and the object plane, and an entrance pupil of the first lens system is located in the scan mirror.

3. The flying-over beam pattern scanning hologram microscope device of claim 2, wherein, when the condition is a first condition, the first and second spherical waves become a plane wave and a converging spherical wave with respect to the object plane, respectively, so that the scan beam projected onto the object plane has the interference structure between the converging spherical wave and the plane wave on the object plane, and
   the first condition is a condition that a focal position of the first spherical wave is the same as a position of the entrance pupil of the first lens system, a focal position of the second spherical wave is the same as the position of the entrance pupil of the first lens system or in front of the entrance pupil of the first lens system, and conical angles (θ1, θ2) of the first and second spherical waves satisfy $\theta_2 \leq \theta_1$.

4. The flying-over beam pattern scanning hologram microscope device of claim 2, wherein, when the condition is a second condition, the first and second spherical waves become a plane wave and a diverging spherical wave with respect to the object plane, respectively, so that the scan beam projected onto the object plane has the interference structure between the diverging spherical wave and the plane wave on the object plane, and
   the second condition is a condition that a focal position of the first spherical wave is the same as a position of the entrance pupil of the first lens system, a focal position of the second spherical wave is the same as the position of the entrance pupil of the first lens system or behind the entrance pupil of the first lens system, and conical angles (θ1, θ2) of the first and second spherical waves satisfy $\theta_2 \leq \theta_1 \leq 2\theta_2$.

5. The flying-over beam pattern scanning hologram microscope device of claim 2, wherein, when the condition is a third condition, both the first and second spherical waves become diverging spherical waves with respect to the object plane, so that the scan beam projected onto the object plane has the interference structure between the two diverging spherical waves on the object plane, and
   the third condition is a condition that a focal position of the first spherical wave is behind the entrance pupil of the first lens system, a focal position of the second spherical wave is behind the focal position of the first spherical wave, and conical angles (θ1, θ2) of the first and second spherical waves satisfy $\theta_2 \leq \theta_1$.

6. The flying-over beam pattern scanning hologram microscope device of claim 2, wherein, when the condition is a fourth condition, the first and second spherical waves become a converging spherical wave and a diverging spherical wave with respect to the object plane, respectively, so that the scan beam projected onto the object plane has the interference structure between the converging spherical wave and the diverging spherical wave on the object surface, and
   the fourth condition is a condition that a focal position of the first spherical wave is in front of the entrance pupil of the first lens system, a focal position of the second spherical wave is behind the entrance pupil of the first lens system, and conical angles (θ1, θ2) of the first and second spherical waves satisfy $\theta_2 < \theta_1$ and satisfy Equation below:

$$|\theta_2 - \theta_1| < \frac{1}{2}|\theta_2 + \theta_1|.$$

7. The flying-over beam pattern scanning hologram microscope device of claim 3, wherein the first lens system transfers the received scan beam to the second lens system, and the first and second lens systems satisfy conditions of Equation below:

$$|\theta_1 + \theta_s| \leq |\theta_1'|$$

$$|\theta_2 + \theta_s| \leq |\theta_1'|$$

$$|r_{sph1}| \leq |f_1 \alpha_1'|$$

$$|r_{sph2}| \leq |f_1 \alpha_1'|,$$

wherein, $\theta_1$ and $\theta_2$ represent the conical angles of the first and second spherical waves, $\theta_s$ represents a scan angle at the scan mirror of the scanning unit, $\theta_1'$ represents an acceptance angle of the first lens system, $f_1$ represents an effective focal length of the first lens system, $\alpha_1'$ represents a convergence angle of a front focal plane of the first lens system, and $r_{sph1}$ and $r_{sph2}$ represent radii of the first and second spherical waves on an entrance pupil plane of the first lens system.

8. The flying-over beam pattern scanning hologram microscope device of claim 4, wherein the first lens system transfers the received scan beam to the second lens system, and the first and second lens systems satisfy conditions of Equation below:

$|\theta_1+\theta_s| \leq |\theta_1{}^r|_1$ $|\theta_2+\theta_s| \leq |\theta_1{}^r|$ $|r_{sph1}| \leq |f_1\alpha_1{}^r|$ $|r_{sph2}| \leq |f_1\alpha_1{}^r|$, wherein, $\theta_1$ and $\theta_2$ represent the conical angles of the first and second spherical waves, $\theta_s$ represents a scan angle at the scan mirror of the scanning unit, $\theta_1{}^r$ represents an acceptance angle of the first lens system, $f_1$ represents an effective focal length of the first lens system, $\alpha_1{}^r$ represents a convergence angle of a front focal plane of the first lens system, and $r_{sph1}$ and $r_{sph2}$ represent radii of the first and second spherical waves on an entrance pupil plane of the first lens system.

9. The flying-over beam pattern scanning hologram microscope device of claim 5, wherein the first lens system transfers the received scan beam to the second lens system, and the first and second lens systems satisfy conditions of Equation below:

$|\theta_1+\theta_s| \leq |\theta_1{}^r|_1$ $|\theta_2+\theta_s| \leq |\theta_1{}^r|$ $|r_{sph1}| \leq |f_1\alpha_1{}^r|$ $|r_{sph2}| \leq |f_1\alpha_1{}^r|$, wherein, $\theta_1$ and $\theta_2$ represent the conical angles of the first and second spherical waves, $\theta_s$ represents a scan angle at the scan mirror of the scanning unit, $\theta_1{}^r$ represents an acceptance angle of the first lens system, $f_1$ represents an effective focal length of the first lens system, $\alpha_1{}^r$ represents a convergence angle of a front focal plane of the first lens system, and $r_{sph1}$ and $r_{sph2}$ represent radii of the first and second spherical waves on an entrance pupil plane of the first lens system.

10. The flying-over beam pattern scanning hologram microscope device of claim 6, wherein the first lens system transfers the received scan beam to the second lens system, and the first and second lens systems satisfy conditions of Equation below:

$|\theta_s-\theta_1| \leq |\theta_1{}^r|_1$ $\theta_2+\theta_s \leq \theta_1{}^r$ $r_{sph1} \leq f_1\alpha_1{}^r$ $r_{sph2} \leq f_1\alpha_1{}^r$, wherein, $\theta_1$ and $\theta_2$ represent the conical angles of the first and second spherical waves, $\theta_s$ represents a scan angle at the scan mirror of the scanning unit, $\theta_1{}^r$, represents an acceptance angle of the first lens system, $f_1$ represents an effective focal length of the first lens system, $\alpha_1{}^r$ represents a convergence angle of a front focal plane of the first lens system, and $r_{sph1}$ and $r_{sph2}$ represent radii of the first and second spherical waves on an entrance pupil plane of the first lens system.

11. The flying-over beam pattern scanning hologram microscope device of claim 7, wherein both of a radius of the plane wave on the object plane corresponding to the first spherical wave and a radius of the converging spherical wave on the object plane corresponding to the second spherical wave are smaller than or equal to a radius of field of view of the objective lens as shown in Equation below:

$$\left|(\theta_1+\theta_s)\frac{f_0 f_1}{f_2}\right| \leq |F_{obj}|, \left|(\theta_2+\theta_s)\frac{f_0 f_1}{f_2}\right| \leq |F_{obj}|,$$

wherein $\theta_1$ and $\theta_2$ represent the conical angles of the first and second spherical waves, $\theta_s$ represents a scan angle at the scan mirror of the scanning unit, $F_{obj}$ represents a radius of field of view in a front focal plane of the objective lens, $f_0$ represents an effective focal length of the objective lens, and $f_1$ and $f_2$ represent effective focal lengths of the first and second lens systems.

12. The flying-over beam pattern scanning hologram microscope device of claim 8, wherein both of a radius of the plane wave on the object plane corresponding to the first spherical wave and a radius of the diverging spherical wave on the object plane corresponding to the second spherical wave are smaller than or equal to a radius of field of view of the objective lens as shown in Equation below:

$$\left|(\theta_1+\theta_s)\frac{f_0 f_1}{f_2}\right| \leq |F_{obj}|, \left|(\theta_2+\theta_s)\frac{f_0 f_1}{f_2}\right| \leq |F_{obj}|,$$

wherein $\theta_1$ and $\theta_2$ represent the conical angles of the first and second spherical waves, $\theta_s$ represents a scan angle at the scan mirror of the scanning unit, $F_{obj}$ represents a radius of field of view in a front focal plane of the objective lens, $f_0$ represents an effective focal length of the objective lens, and $f_1$ and $f_2$ represent effective focal lengths of the first and second lens systems.

13. The flying-over beam pattern scanning hologram microscope device of claim 9, wherein both of a radius of the diverging spherical wave on the object plane corresponding to the first spherical wave and a radius of the diverging spherical wave on the object plane corresponding to the second spherical wave are smaller than or equal to a radius of field of view of the objective lens as shown in Equation below:

$$\left|(\theta_1+\theta_s)\frac{f_0 f_1}{f_2}\right| \leq |F_{obj}|, \left|(\theta_2+\theta_s)\frac{f_0 f_1}{f_2}\right| \leq |F_{obj}|,$$

wherein $\theta_1$ and $\theta_2$ represent the conical angles of the first and second spherical waves, $\theta_s$ represents a scan angle at the scan mirror of the scanning unit, $F_{obj}$ represents a radius of field of view in a front focal plane of the objective lens, $f_0$ represents an effective focal length of the objective lens, and $f_1$ and $f_2$ represent effective focal lengths of the first and second lens systems.

14. The flying-over beam pattern scanning hologram microscope device of claim 10, wherein both of a radius of the converging spherical wave on the object plane corresponding to the first spherical wave and a radius of the diverging spherical wave on the object plane corresponding to the second spherical wave are smaller than or equal to a radius of field of view of the objective lens as shown in Equation below:

$$\left|(\theta_1 - \theta_s)\frac{f_0 f_1}{f_2}\right| \le |F_{obj}|, \left|(\theta_2 + \theta_s)\frac{f_0 f_1}{f_2}\right| \le |F_{obj}|,$$

wherein $\theta_1$ and $\theta_2$ represent the conical angles of the first and second spherical waves, $\theta_s$ represents a scan angle at the scan mirror of the scanning unit, $F_{obj}$ represents a radius of field of view in a front focal plane of the objective lens, $f_0$ represents an effective focal length of the objective lens, and $f_1$ and $f_2$ represent effective focal lengths of the first and second lens systems.

15. The flying-over beam pattern scanning hologram microscope device of claim 11, wherein optical invariance of the first and second lens systems is greater than or equal to optical invariance of the objective lens as shown in Equation below:

$$I_1 \ge I_{obj}, I_2 \ge I_{obj},$$

wherein, $I_1$, $I_2$, and $I_{obj}$ represent optical invariance of the first lens system, the second lens system, and the objective lens, respectively.

16. The flying-over beam pattern scanning hologram microscope device of claim 2, wherein the light collection unit comprises:
a optical splitter which is disposed between the second lens system and the objective lens, and which transfers the beam passing through the second lens system to the objective lens, and reflects the beam reflected from the object and passing through the objective lens to the outside;
a third lens system which receives the beam reflected by the optical splitter; and
a photodetector which detects a beam passing through the third lens system,
wherein a size of a detection plane of the photodetector satisfies Equation below:

$$\left|\frac{\theta_s f_1 f_3}{f_2}\right| \le |F_{pd}| \text{ or } \left|\frac{F_0 f_3}{f_0}\right| \le |F_{pd}|,$$

wherein $F_{pd}$ represents the size of the detection plane, $\theta s$ represents a scan angle at the scan mirror of the scanning unit, $f_1$ to $f_3$ represent effective focal lengths of the first to third systems, $f_0$ represents an effective focal length of the objective lens, and $F_o$ represents a radius of a field of view in a front focal plane of the objective lens.

17. The flying-over beam pattern scanning hologram microscope device of claim 2, wherein the light collection unit comprises:
a optical splitter which is disposed between the first lens system and the second lens system, and which transfers the beam passing through the first lens system to the second lens system, and reflects the beam reflected from the object and passing the second lens system through the objective lens to the outside;
a third lens system which receives the beam reflected by the optical splitter;
a fourth lens system which receives the beam passing through the third lens system; and
a photodetector which detects a beam passing through the fourth lens system,
wherein a size of a detection plane of the photodetector satisfies Equation below:

$$\left|\frac{\theta_s f_1 f_4}{f_3}\right| \le |F_{pd}| \text{ or } \left|\frac{F_0 f_2 f_4}{f_0 f_3}\right| \le |F_{pd}|,$$

wherein $F_{pd}$ represents the size of the detection plane, $\theta s$ represents a scan angle at the scan mirror of the scanning unit, $f_1$ to $f_4$ represent effective focal lengths of the first to fourth systems, $f_0$ represents an effective focal length of the objective lens, and $F_o$ represents a radius of a field of view in a front focal plane of the objective lens.

18. The flying-over beam pattern scanning hologram microscope device of claim 2, wherein the light collection unit comprises:
a optical splitter which is disposed between the second lens system and the objective lens, and which transfers the beam passing through the second lens system to the objective lens, and reflects the beam reflected from the object and passing the objective lens to the outside;
a third lens system which receives the beam reflected by the optical splitter;
a fourth lens system which receives the beam passing through the third lens system; and
a photodetector which detects a beam passing through the fourth lens system,
wherein a spatial frequency-converted light distribution of an image on the object plane of the objective lens is generated on a detection plane of the photodetector, and a size of the detection plane of the photodetector satisfies Equation below:

$$|0.1 f_4 NA_{eff}| \le |F_{pd}|,$$

wherein $F_{pd}$ represents the size of the detection plane of the photodetector, $f_4$ represents an effective focal length of the fourth lens system, and $NA_{eff}$ represents an effective numerical aperture of the beam transferred to the object plane and is defined as a difference $|NA_{eff}| = |NA_1 - NA_2|$ between a numerical aperture ($NA_1$) of the first spherical wave and a numerical aperture ($NA_2$) of the second spherical wave, the first spherical wave and the second spherical wave being transferred to the object plane.

19. The flying-over beam pattern scanning hologram microscope device of claim 2, wherein the light collection unit comprises:
a optical splitter which is disposed between the first lens system and the second lens system, and which transfers the beam passing through the first lens system to the second lens system, and reflects the beam reflected from the object and passing the second lens system through the objective lens to the outside;
a third lens system which receives the beam reflected by the optical splitter; and
a photodetector which detects a beam passing through the third lens system,
wherein a spatial frequency-converted light distribution of an image on the object plane of the objective lens is generated on a detection plane of the photodetector, and a size of the detection plane of the photodetector satisfies Equation below:

$$|0.1 f_3 NA_{eff}| \le |F_{pd}|,$$

wherein $F_{pd}$ represents the size of the detection plane of the photodetector, $f_3$ represents an effective focal length of the third lens system, and $NA_{eff}$ represents an effective numerical aperture of the beam transferred to the object plane and is defined as a difference $|NA_{eff}|=|NA_1-NA_2|$ between a numerical aperture ($NA_1$) of the first spherical wave and a numerical aperture ($NA_2$) of the second spherical wave, the first spherical wave and the second spherical wave being transferred to the object plane.

* * * * *